(12) United States Patent
Mercer et al.

(10) Patent No.: US 11,949,331 B2
(45) Date of Patent: Apr. 2, 2024

(54) DUAL PATH SPLIT-CAPACITOR POWER CONVERTER

(71) Applicant: Dialog Semiconductor (UK) Limited, London (GB)

(72) Inventors: Mark Mercer, Phoenix, AZ (US); Kevin Dowdy, Phoenix, AZ (US); Holger Petersen, Pastetten (DE)

(73) Assignee: Dialog Semiconductor (UK) Limited, London (GB)

( * ) Notice: Subject to any disclaimer, the term of this patent is extended or adjusted under 35 U.S.C. 154(b) by 175 days.

(21) Appl. No.: 17/559,305

(22) Filed: Dec. 22, 2021

(65) Prior Publication Data

US 2023/0198385 A1 Jun. 22, 2023

(51) Int. Cl.
*H02M 3/07* (2006.01)
*H02M 1/00* (2006.01)
*H02M 3/158* (2006.01)

(52) U.S. Cl.
CPC .......... *H02M 3/07* (2013.01); *H02M 1/0045* (2021.05); *H02M 3/072* (2021.05); *H02M 1/0095* (2021.05); *H02M 3/158* (2013.01)

(58) Field of Classification Search
CPC ............ H02M 1/0043; H02M 1/0045; H02M 1/0095; H02M 1/14; H02M 1/15; H02M 3/07–077; H02M 3/158; H02M 3/1584; H02M 3/1586
See application file for complete search history.

(56) References Cited

U.S. PATENT DOCUMENTS

| 10,790,742 | B1 | 9/2020 | Petersen | |
|---|---|---|---|---|
| 2015/0155895 | A1* | 6/2015 | Perreault | H02M 3/07 330/297 |
| 2016/0352218 | A1* | 12/2016 | Stauth | H02M 3/07 |
| 2018/0175726 | A1* | 6/2018 | Petersen | H02M 3/07 |
| 2022/0302817 | A1* | 9/2022 | Morimoto | H02M 1/0048 |
| 2023/0134427 | A1* | 5/2023 | Liu | H02M 3/07 323/271 |

OTHER PUBLICATIONS

A. Abdulslam, B. H. Lam and P. P. Mercier, "A Battery-Connected Symmetric Modified Multilevel Ladder Converter Achieving 0.45W/mm2 Power Density and 90% Peak Efficiency," 2019 IEEE Custom Integrated Circuits Conference (CICC), Austin, TX, USA, 2019, pp. 1-4, doi: 10.1109/CICC.2019.8780196. (Year: 2019).*

(Continued)

*Primary Examiner* — Fred E Finch, III
(74) *Attorney, Agent, or Firm* — Saile Ackerman LLC; Stephen B. Ackerman

(57) ABSTRACT

The present document describes a power converter configured to convert electrical power at an input voltage at an input of the power converter to electrical power at an output voltage at an output of the power converter. The power converter comprises a first upper capacitor and a first lower capacitor, which are coupled with one another via a first mid node; a second upper capacitor and a second lower capacitor, which are coupled with one another via a second mid node; an inductor; and a set of power switches. In addition, the power converter comprises a control unit which is configured to control the set of power switches such that during an operation cycle the power converter is operated in a first main state and in a second main state in a mutually exclusive manner.

19 Claims, 29 Drawing Sheets

(56) References Cited

OTHER PUBLICATIONS

"A Hybrid Structure Dual-Path Step-Dwon Converter With 96.2% Peak Efficiency Using 250-mΩ Large-DCR Inductor," by Yeunhee Huh et al., IEEE Journal of Solid-State Circuits, Apr. 2019. pp 1-9.
"48V-to-12V Dual-Path Hybrid DC-DC Converter," by Katsuhiro Hata et al., 2020 IEEE Applied Power Electronics Conference and Exposition (APEC), Mar. 15-09, 2020, pp. 2279-2284.

* cited by examiner

DUAL PATH SPLIT-CAPACITOR POWER CONVERTER

TECHNICAL FIELD

The present document relates to a DC-DC power converter, in particular to a voltage regulator which is optimized for a 3-to-1 or 4-to-1 or 2-to-1 conversion ratio.

BACKGROUND

For many years, the intermediate bus architecture (IBA) has been widely used in data centers and telecommunications systems to step-down the 48V backplane to a 12V bus (4-to-1 conversion ratio). The 4-to-1 conversion ratio may also be used in charger applications, e.g., for converting an input voltage VIN=16V to an output voltage VOUT=4V.

A way to improve efficiency of a Switched Mode Power Supply (SMPS), which comprises a voltage regulator, is to lower the power loss associated with the inductor. This may be achieved by lowering the current ripple and/or the average current. For a single-phase step-down SMPS, the average inductor current is equal to the load current. The ripple current is a function of the conversion ratio (CR) and is minimized (or "nulled") when CR=0 or 1. "Nulling" means that the voltage across the inductor is so small that the inductor current becomes non-linear. Non-linear inductor current is a characteristic of resonant or quasi-resonant operation. Multilevel Converters (MLCs) provide inductor ripple nulls at additional values of CR. For example, a 3-level converter (3LC) has an additional ripple current null at CR=0.5. In other words, the 3LC essentially operates in resonant or quasi-resonant mode when CR=0.5.

SUMMARY

The present document is directed at the technical problem of providing a power converter, in particular a voltage regulator, which allows for an accurate voltage regulation over a wide operating range, i.e., over a wide range of CR, and which is particularly power efficient at a 3-to-1 or 4-to-1 or 2-to-1 conversion ratio.

According to an aspect, a power converter, in particular a voltage regulator, configured to convert electrical power at an (DC) input voltage at an input of the power converter to electrical power at an (DC) output voltage at an output of the power converter.

The power converter comprises a first upper capacitor and a first lower capacitor, which are coupled with one another via a first mid node, and a second upper capacitor and a second lower capacitor, which are coupled with one another via a second mid node. Furthermore, the power converter comprises an inductor and a set of power switches. In addition, the power converter comprises a control unit configured to control the set of power switches such that during an operation cycle the power converter is operated in a first main state and in a second main state in a mutually exclusive manner.

Within the first main state, the power converter exhibits a first current path from ground through the first lower capacitor, through the inductor to the output; and a second current path with a sub-path from the input, through the second upper capacitor, through the second lower capacitor to the output, and with a sub-path from ground through the first lower capacitor, through the first upper capacitor, through the second lower capacitor to the output.

Within the second main state, the power converter exhibits a first current path from ground, through the second lower capacitor, through the inductor to the output, and a second current path with a sub-path from the input, through the first upper capacitor, through the first lower capacitor to the output, and with a sub-path from ground, through the second lower capacitor, through the second upper capacitor, through the first lower capacitor to the output.

According to a further aspect a corresponding method for operating a power converter is described.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, notably directly connected e.g., via wires, or in some other manner

BRIEF DESCRIPTION OF THE DRAWINGS

The invention is explained below in an exemplary manner with reference to the accompanying drawings, wherein.

DESCRIPTION

As indicated above, the present document is directed at providing a voltage regulator which is particularly efficient at a conversion ratio of 4-to-1 or 3-to-1.

Figure 1A:
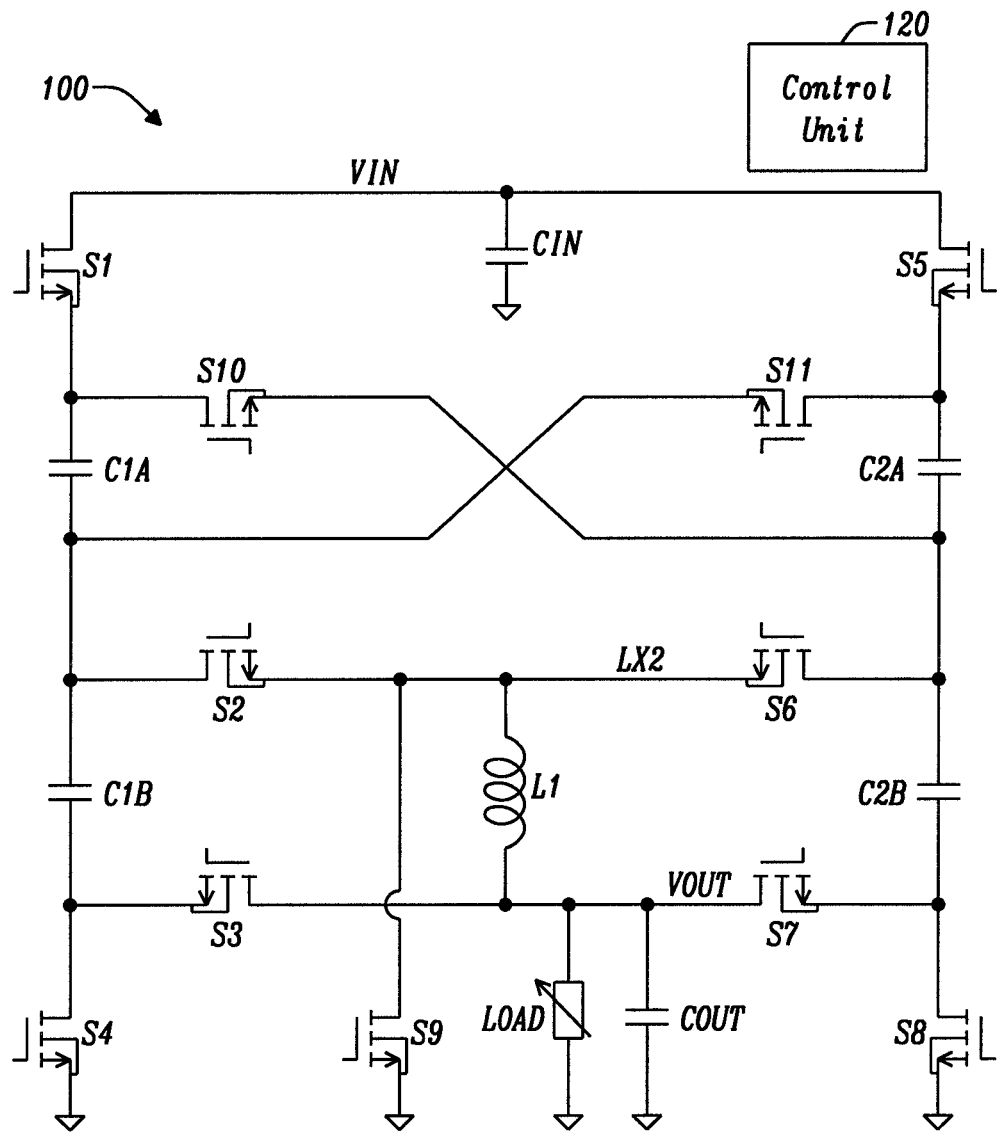
FIG. 1A illustrates an example voltage regulator.

FIG. 1A shows an example voltage regulator 100. The voltage regulator 100 comprises power switches S1, S2, S3, S4, S5, S6, S7, S8, S9, S10 and S11. Furthermore, the voltage regulator 100 comprises flying capacitors C1 and C2, which are split into series of flying capacitors C1A, C1B and C2A and C2B, respectively, i.e., C1→C1A+CB and C2→C2A+C2B. The split-capacitors C1A, C1B are referred to herein as the first upper capacitor C1A and the first lower capacitor C1B. The split-capacitors C2A, C2B are referred to herein as the second upper capacitor C1A and the second lower capacitor C1B.

The voltage regulator 100 exhibits a peak efficiency at a conversion ratio (CR) of 0.33. Furthermore, the voltage regulator 100 is capable of maintaining accurate regulation over a relatively wide range of operating conditions, which is particularly beneficial for battery chargers used in mobile phone applications.

The control of the voltage regulator 100 (which may be performed by the control unit 120) may be based on a PWM scheme consisting of on an error amplifier and two interleaved ramp signals, phased 180° apart. A ramp signal may be started and reset by a clock signal. The modulator may be configured to produce two pulses of equal duration. The duty cycle of the two pulses with respect to the clock period may be designated as $D1_{PWM}$ and $D2_{PWM}$. An error signal (produced by an error amplifier) may interact with the PWM ramps to create a first duty cycle interval (for a first main state D1) and a second duty cycle interval (for a second main state D2). Alternatively, the PWM pulses may be generated by other means such as a digital controller 120.

If $D1_{PWM}$ and $D2_{PWM}$ do not overlap, the intervening interval (and/or the corresponding state) may be designated as DV. If $D1_{PWM}$ and $D2_{PWM}$ overlap, the overlap interval (and/or the corresponding state) may be designated as DP. The four duty cycle intervals D1, D2, DV and DP may correspond to respective states of the voltage regulator 100, which lead to specific changes in the energy storage elements C1, C2 and/or L1 (or L2) as described in the present document. In particular, the duty cycle interval and/or state DP may be used to magnetize the inductor L1, L2 (resulting in a peak inductor current condition). The duty cycle interval and/or state DV may be used to demagnetize the inductor L1, L2 (resulting in a valley inductor current condition). The duty cycle interval and/or state D1 may be used to charge the flying capacitor C1B (while the inductor L1, L2 may be either magnetized or demagnetized depending on the CR). The duty cycle interval and/or state D2 may be used to charge C2B (while the inductor L1, L2 may be magnetized or demagnetized depending on the CR).

As per standard convention, all duty cycle values are typically limited to the range from 0 to 1. A steady-state operation for a hybrid power converter typically requires that the Volt-sec balance be maintained for the inductor L1, and/or that the Amp-sec balance be maintained for the flying capacitors C1, C2. The switching sequence (as defined by the duty cycle sequence) may ensure that these two requirements are satisfied.

Figure 1B:
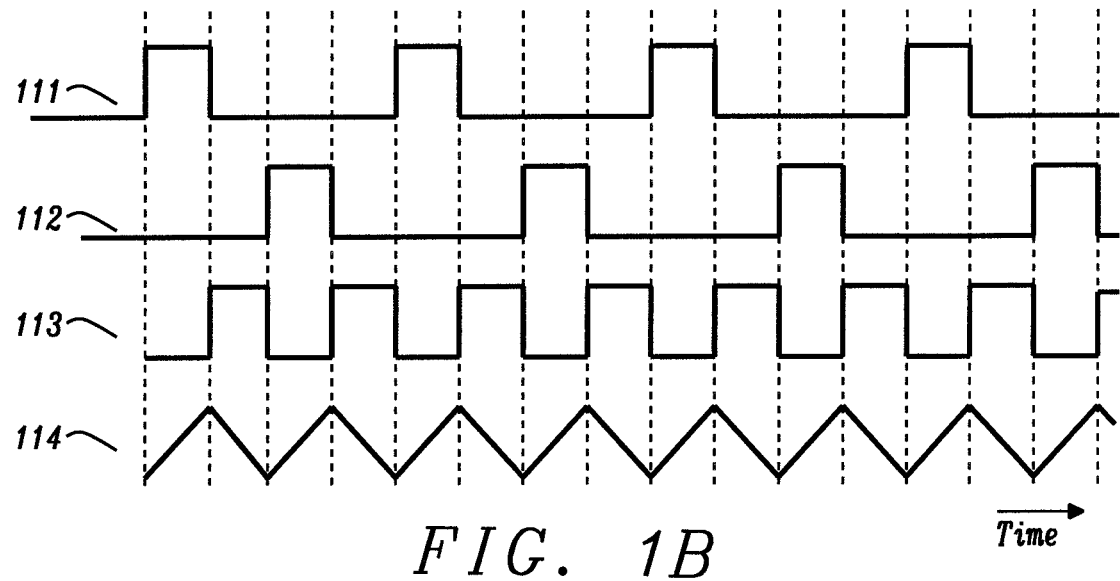
FIG. 1B shows PWM pulses for different phases or states of the voltage regulator of FIG. 1A (in case of a relatively low duty cycle)

FIG. 1B illustrates example switching states (and/or corresponding duty cycle intervals) D1 111, D2 112, DV 113 for a relatively low duty cycle. The switching sequence is D1→DV→D2→DV→(repeat). Furthermore, FIG. 1B illustrates the corresponding inductor current 114 through the inductor L1, L2.

Figure 1C:
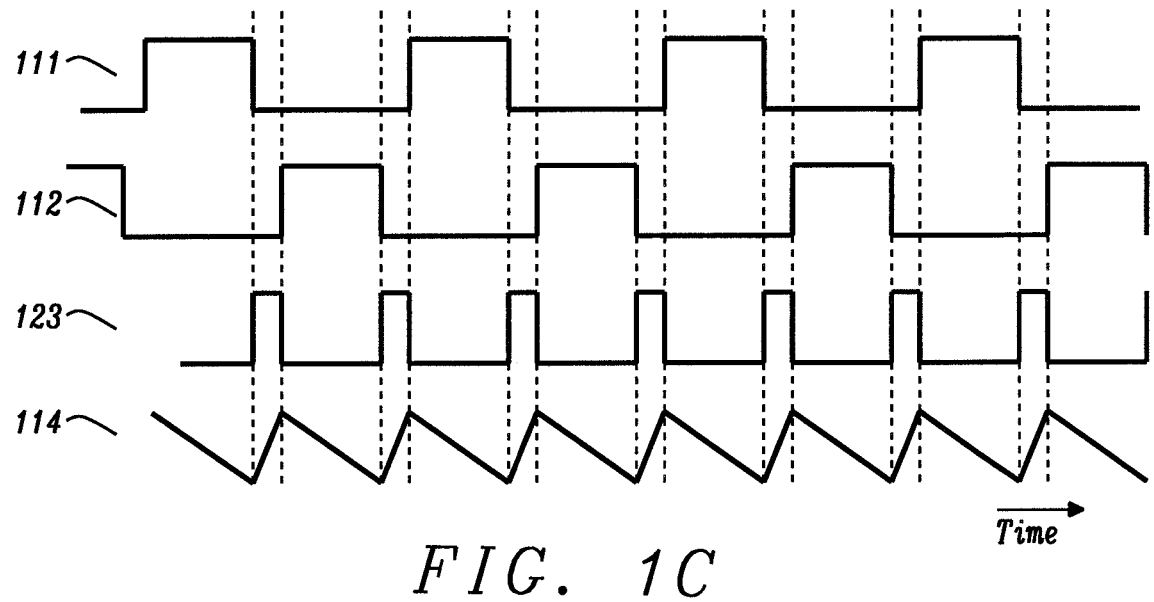
FIG. 1C shows PWM pulses for different phases of the voltage regulator of FIG. 1A (in case of a relatively high duty cycle)

FIG. 1C illustrates example switching states (and/or corresponding duty cycle intervals) D1 111, D2 112, DP 123 for a relatively high duty cycle. The switching sequence is D1→DP→D2→DP→(repeat). Furthermore, FIG. 1B illustrates the corresponding inductor current 114 through the inductor L1, L2.

The split-capacitor voltage regulator 100 may exhibit three different regions of operation, corresponding to three different ranges of CR:

region 1: VIN≥3*VOUT (i.e., 0≤CR<0.33);
region 2: 3*VOUT≥VIN≥2*VOUT (i.e., 0.33≤CR≤0.5); and
region 3: VIN≤2*VOUT (i.e., 0.5≤CR≤1).

For region 3, the voltage regulator 100 may be operated by maintaining the power switches S10 and S11 constantly closed, thereby removing the influence of the partial flying capacitors C1A and C2A on the operation of the voltage regulator 100. On the other hand, the partial flying capacitors C1A and C2A contribute to the operation of the voltage regulator 100 in regions 1 and 2. In view of this difference in the mode of operating, a transition between the different operation regions may be defined to avoid disturbances in the regulated output of the voltage regulator 100 (for the transition between regions 2 and 3).

FIGS. 2A to 2D illustrate the switching states D1, D2, DV1 and DV2, respectively, for the region 1 with VIN≥3*VOUT, where 0.33≥CR≥0. The state sequence may repeat according to the following switching pattern: D1→DV1→D2→DV2→(repeat), as illustrated in FIG. 1B (wherein DV is replaced by DV1 and DV2 in an alternating manner). The sequence of state D1→DV1→D2→DV2 may correspond to a complete operation cycle, which is repeated at a pre-determined frequency.

Figure 2A:
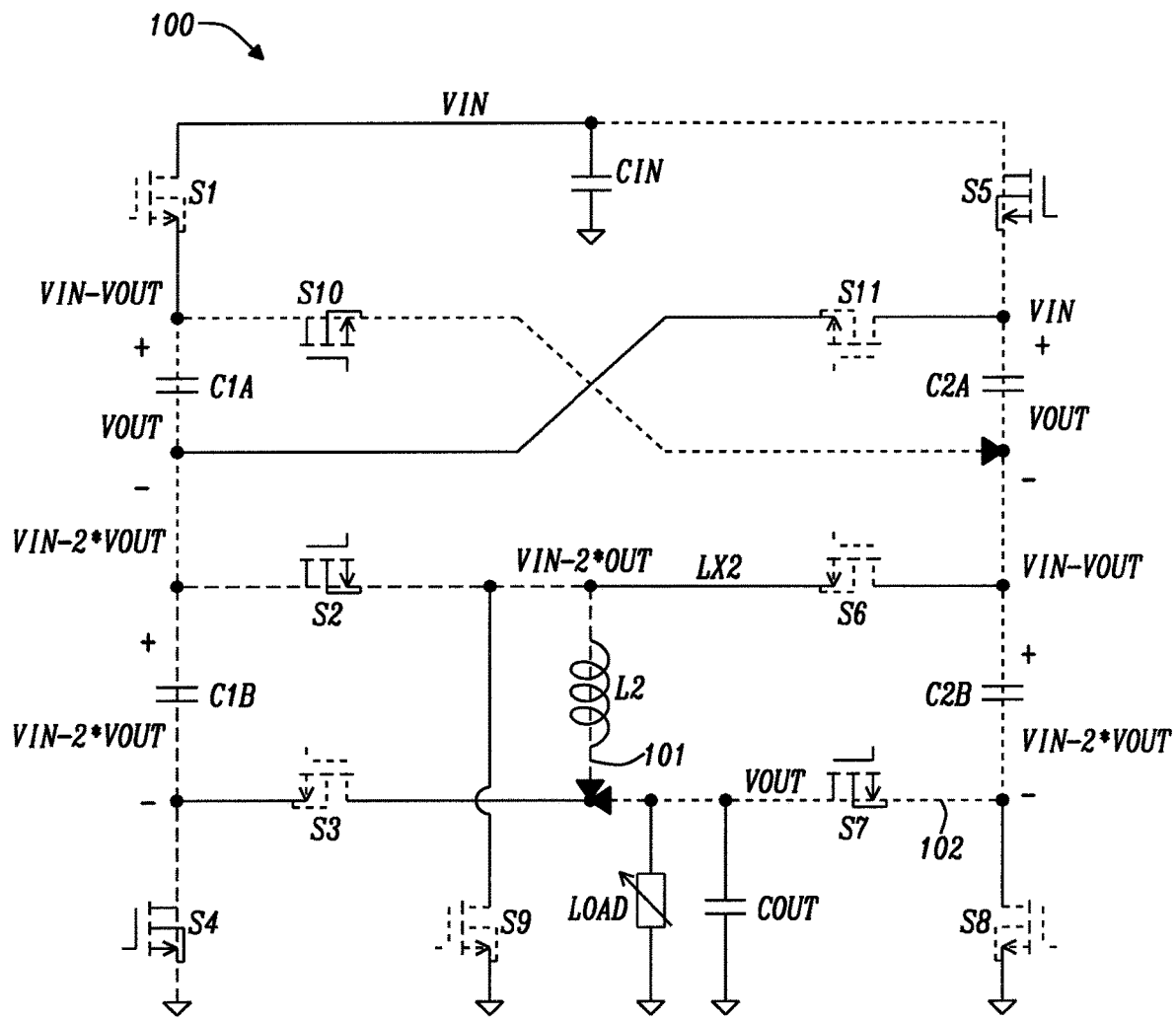
FIG. 2A illustrates the dual current paths of a first main state (referred to herein as D1)

During the switching state D1 111, the switches S1, S3, S6, S8, S9 and S11 are open, and the switches S2, S4, S5, S7 and S10 are closed, as illustrated in FIG. 2A. The current at the output of the voltage regulator 100 is provided via a main path 101 (through the inductor L1, L2) and via an auxiliary path 102 (bypassing the inductor L1, L2). In the present document, the main path 101 is illustrated by a dashed line, and the auxiliary path 102 is illustrated by a dotted line (apart from FIGS. 9A to 9F, where the main path 101 is indicated by a dotted line and the auxiliary path 102 is indicated by a line comprises dots and dashes). The main path 101 may be referred to as the first current path, and the auxiliary path 102 may be referred to as the second current path. The (dual-path) current which is provided by the auxiliary path 102 supplements the current provided by the main path 102. The figures, notably FIG. 2A, indicate the (approximate) voltages at different nodes within the voltage regulator 100.

The partial flying capacitor C1B (also referred to as the first lower capacitor) is discharged to magnetize the inductor L1, L2 (via the main path 101). Furthermore, the partial flying capacitor C1A (also referred to as the first higher capacitor) is discharged to charge the partial flying capacitor C2B (via the auxiliary path 102). In addition, the partial flying capacitors C2A and C2B (also referred to as the second higher capacitor and the second lower capacitor, respectively) are charged from the input of the voltage regulator 100 (via the auxiliary path 102).

Figure 2B:
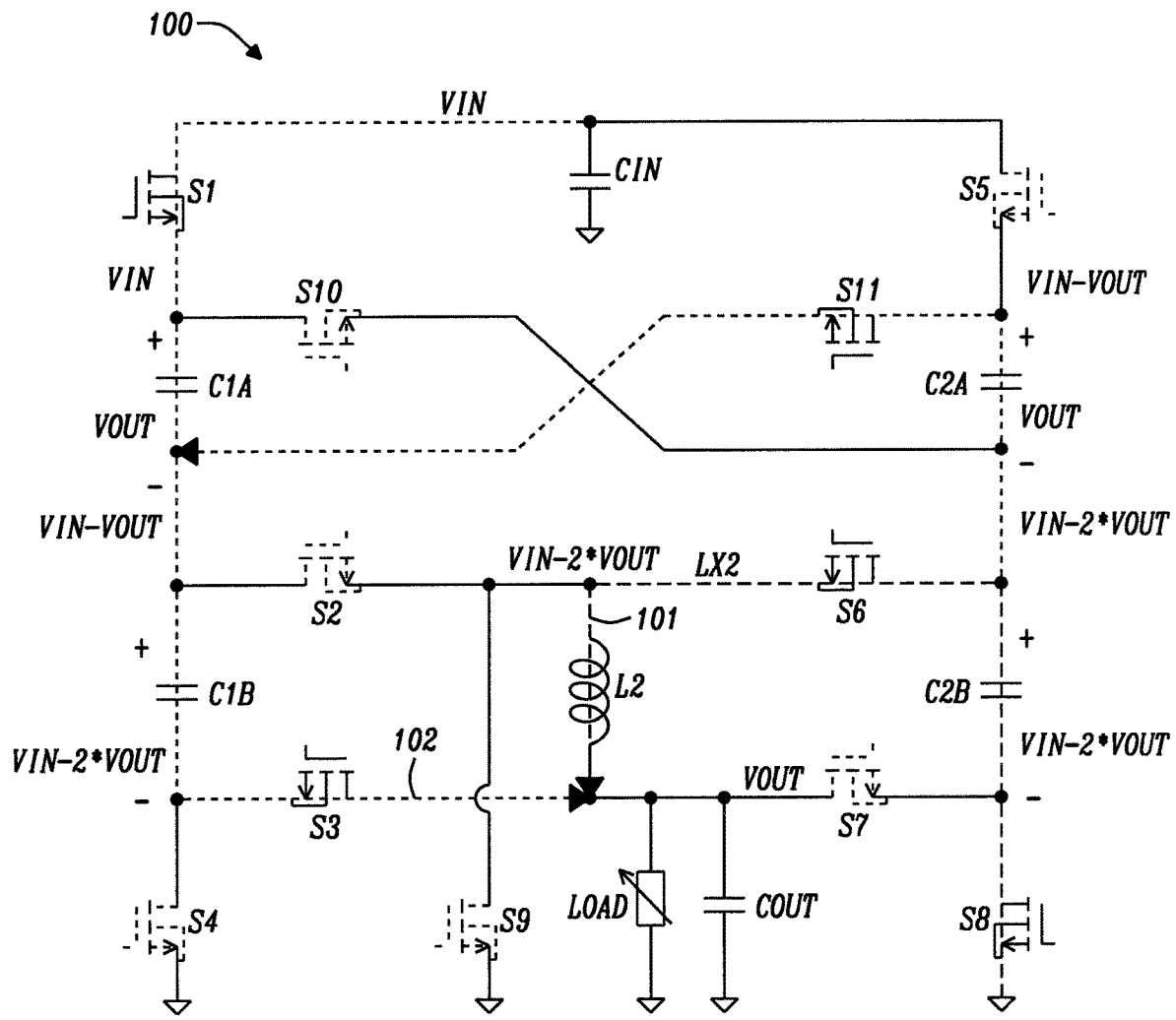
FIG. 2B illustrates the dual current paths of a second main state (referred to herein as D2)

FIG. 2B illustrates the switching state D2 112, during which the switches S1, S3, S6, S8 and S11 are closed, and the switches S2, S4, S5, S7, S9 and S10 are open. The partial flying capacitor C2B is discharged to magnetize the inductor L1, L2 (via the main path 101). Furthermore, the partial flying capacitor C2A is discharged to charge the partial flying capacitor C1B (via the auxiliary path 102). In addition, the partial flying capacitors C1A and C1B are charged from the input of the voltage regulator 100 (via the auxiliary path 102). Hence, the state D2 112 is complementary to the state D1 111.

Figure 2C:
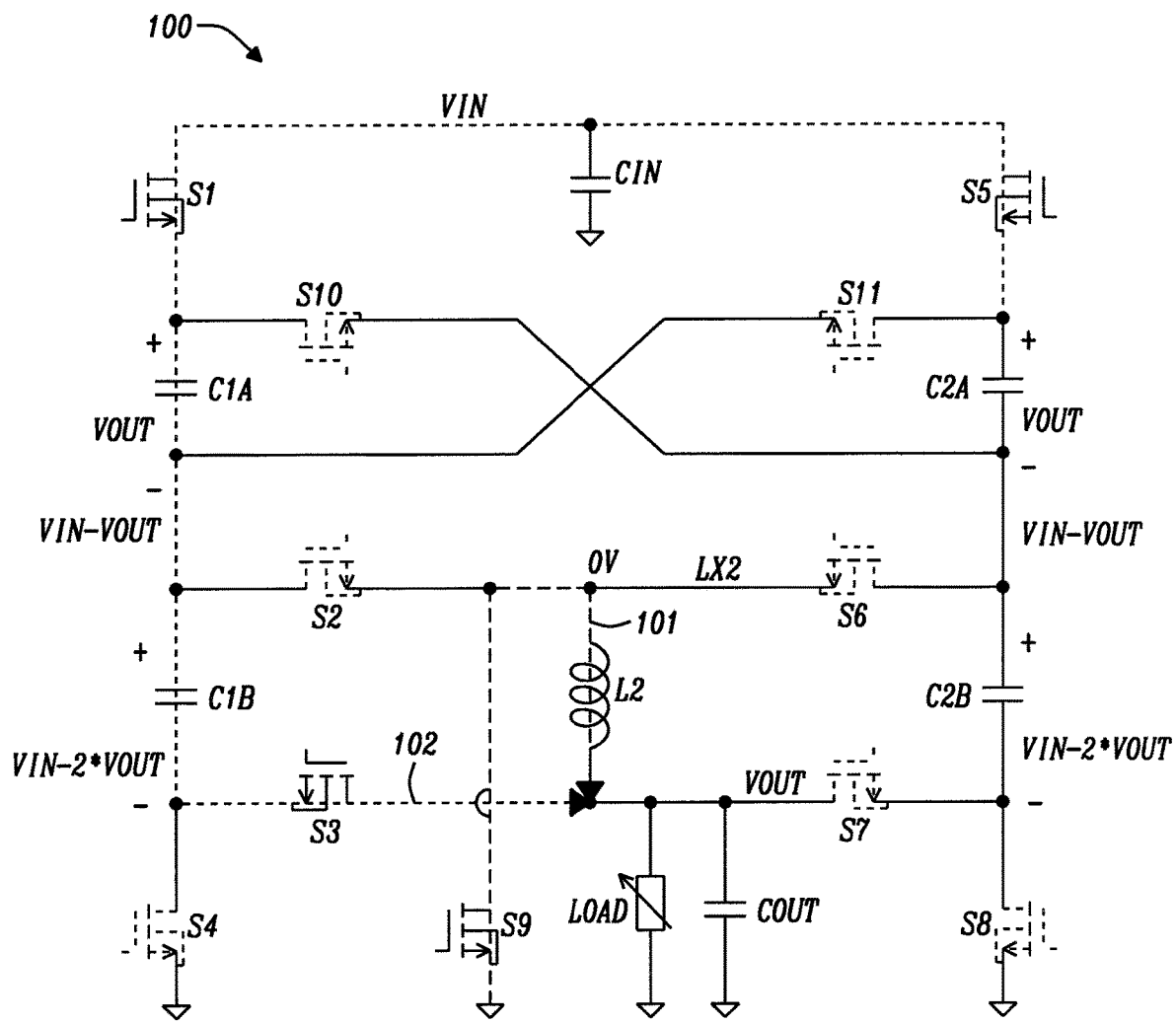
FIG. 2C illustrates the dual current paths of a first valley state (referred to herein as DV1)

FIG. 2C illustrates the switching state DV1 113, during which the switches S2, S4, S6, S7, S8, S10 and S11 are open, and the switches S1, S3, S5 and S9 are closed. The inductor L1, L2 is demagnetized to ground via the closed switch S9 (via the main path 101). The partial flying capacitors C1A and C1B are charged from the input of the voltage regulator 100 (via the auxiliary path 102).

Figure 2D:
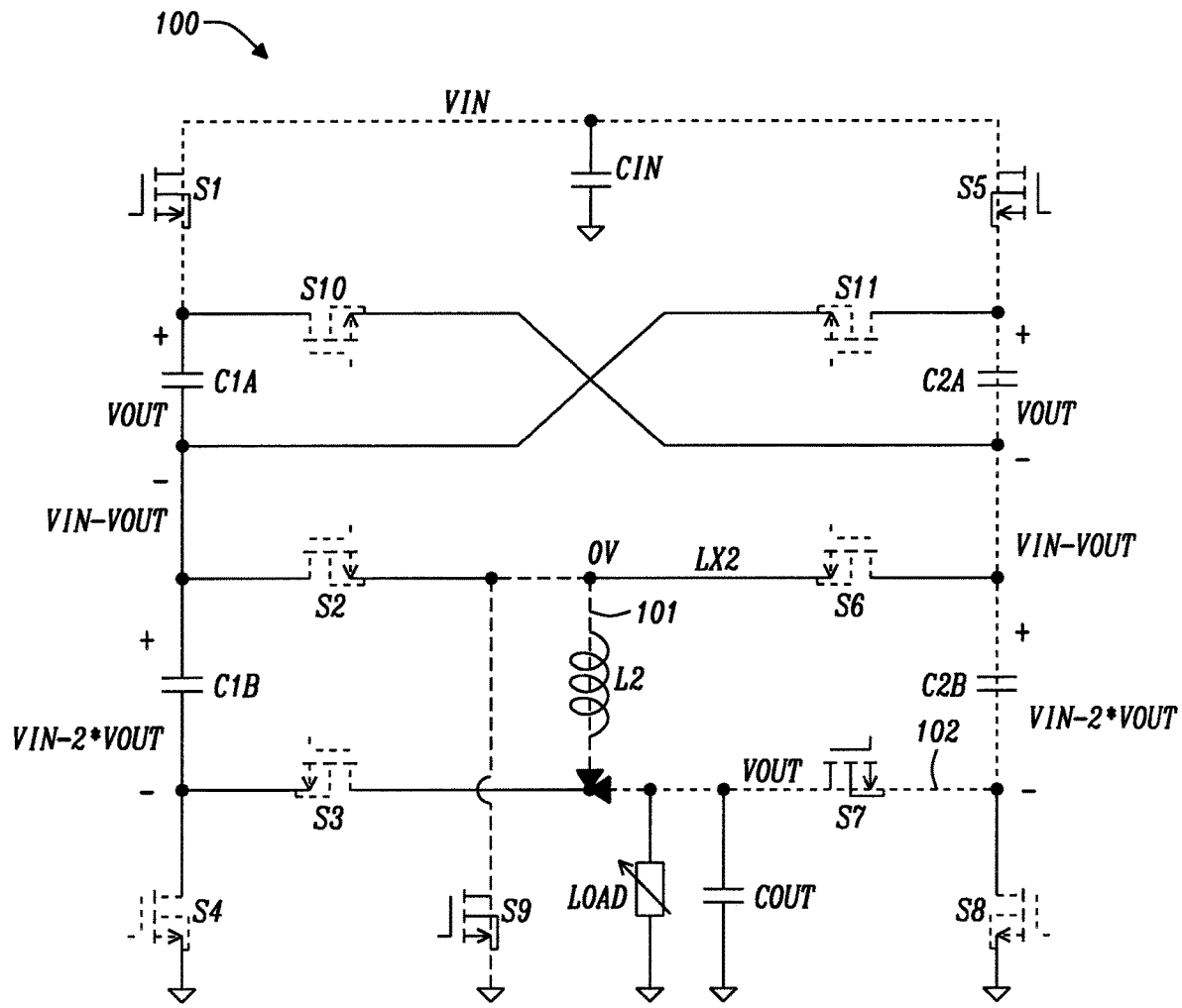
FIG. 2D illustrates the dual current paths of a second valley state (referred to herein as DV2)

FIG. 2D illustrates the switching state DV2 113 which is complementary to the switching state DV1 113. During the switching state DV2 113 the switches S2, S3, S4, S6, S8, S10 and S11 are open, and the switches S1, S5, S7 and S9 are closed. The inductor L1, L2 is demagnetized to ground via the closed switch S9 (via the main path 101). The partial flying capacitors C2A and C2B are charged from the input of the voltage regulator 100 (via the auxiliary path 102).

FIGS. 3A to 3F show example switching states for operating the voltage regulator 100 in the region 2 for 3*VOUT≥VIN≥2*VOUT, where 0.5≥CR≥0.33. The transition from region 1 operation to region 2 operation is essentially seamless if the PWM modulation scheme illustrated in FIGS. 1B and 1C are used, wherein the modulation scheme of FIG. 1B is used in region 1 and the modulation scheme of FIG. 1C is used in region 2.

Four switch states may be used to create a complete switching cycle for region 2 operation. These states may be designated as D1 111, D2 112, DP1 123 and DP2 123, in accordance with FIG. 1C, where DP1 and DP2 coincide with DP in an alternating manner. The state sequence repeats according to the following pattern: D1→DP1→D2→DP2→(repeat) .... The sequence of state D1→DP1→D2→DP2 may correspond to a complete operation cycle, which is repeated at a pre-determined frequency.

FIGS. 3A to 3D illustrated the four switch states D1, D2, DP1 and DP2, respectively. Furthermore, the voltage levels at different nodes of the voltage regulator 100 are indicated. The switching state D1 111 of FIG. 3A corresponds to the switching state D1 111 of FIG. 2A. The switching state D2 112 of FIG. 3B corresponds to the switching state D2 112 of FIG. 2B.

However, for region 2 operation, in the state D1, the partial flying capacitor C1B is charged and the inductor L1, L2 is demagnetized (via the main path 101). The partial flying capacitor C1A is discharged to charge the partial flying capacitor C2B (via the auxiliary path 102). In addition, the partial flying capacitors C2A and C2B are charged from the input of the voltage regulator 100 (via the auxiliary path 102).

In a similar manner, for region 2 operation, in the state D2, the partial flying capacitor C2B is charged and the inductor L1, L2 is demagnetized (via the main path 101). Furthermore, the partial flying capacitor C2A is discharged to charge the partial flying capacitor C1B (via the auxiliary path 102). In addition, the partial flying capacitors C1A and C1B are charged from the input of the voltage regulator 100 (via the auxiliary path 102). Hence, the state D2 112 is complementary to the state D1 111.

Figure 3A:
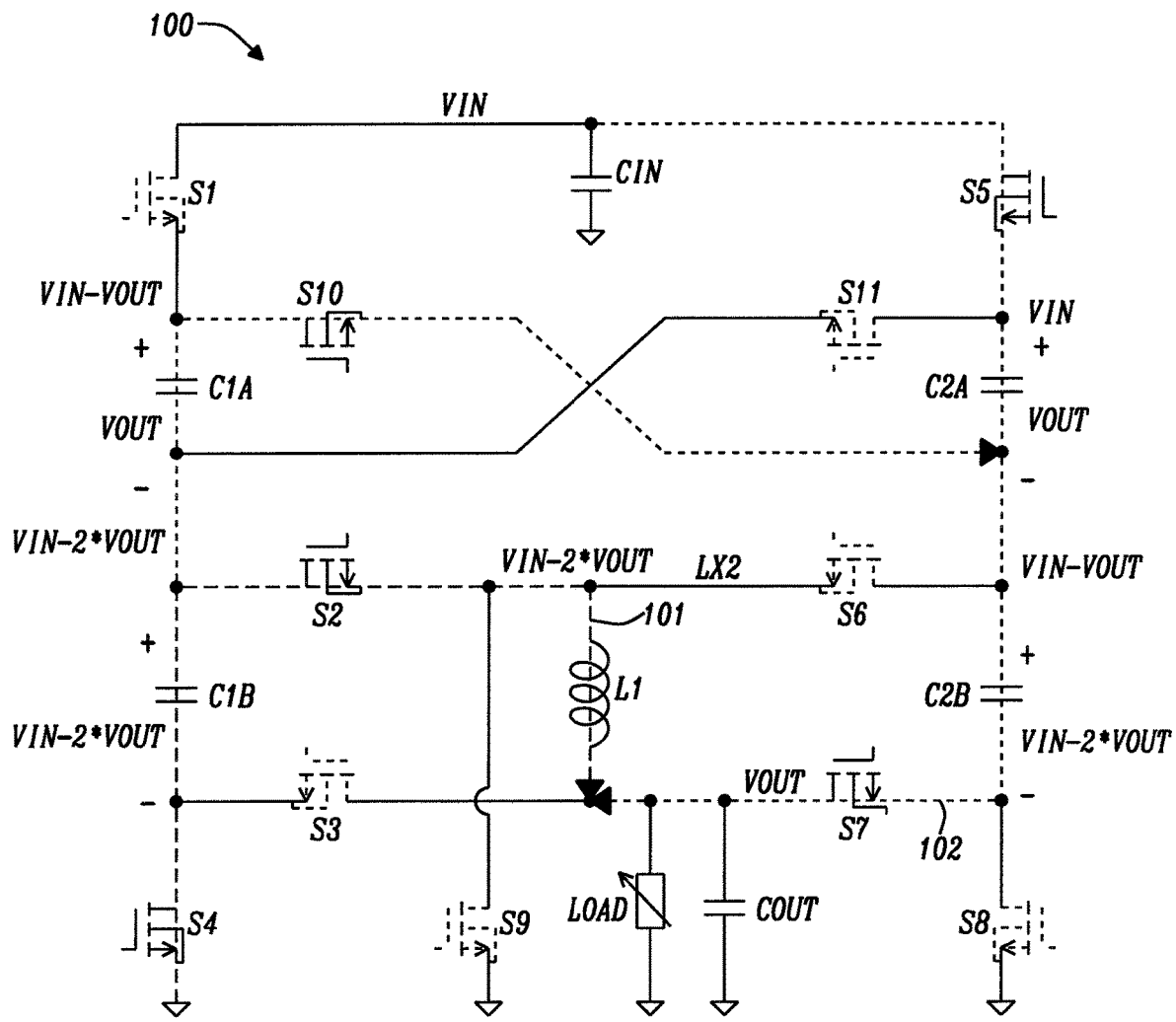
FIG. 3A illustrates the dual current paths of a first main state (referred to herein as D1) for relatively high conversion ratios.
Figure 3B:
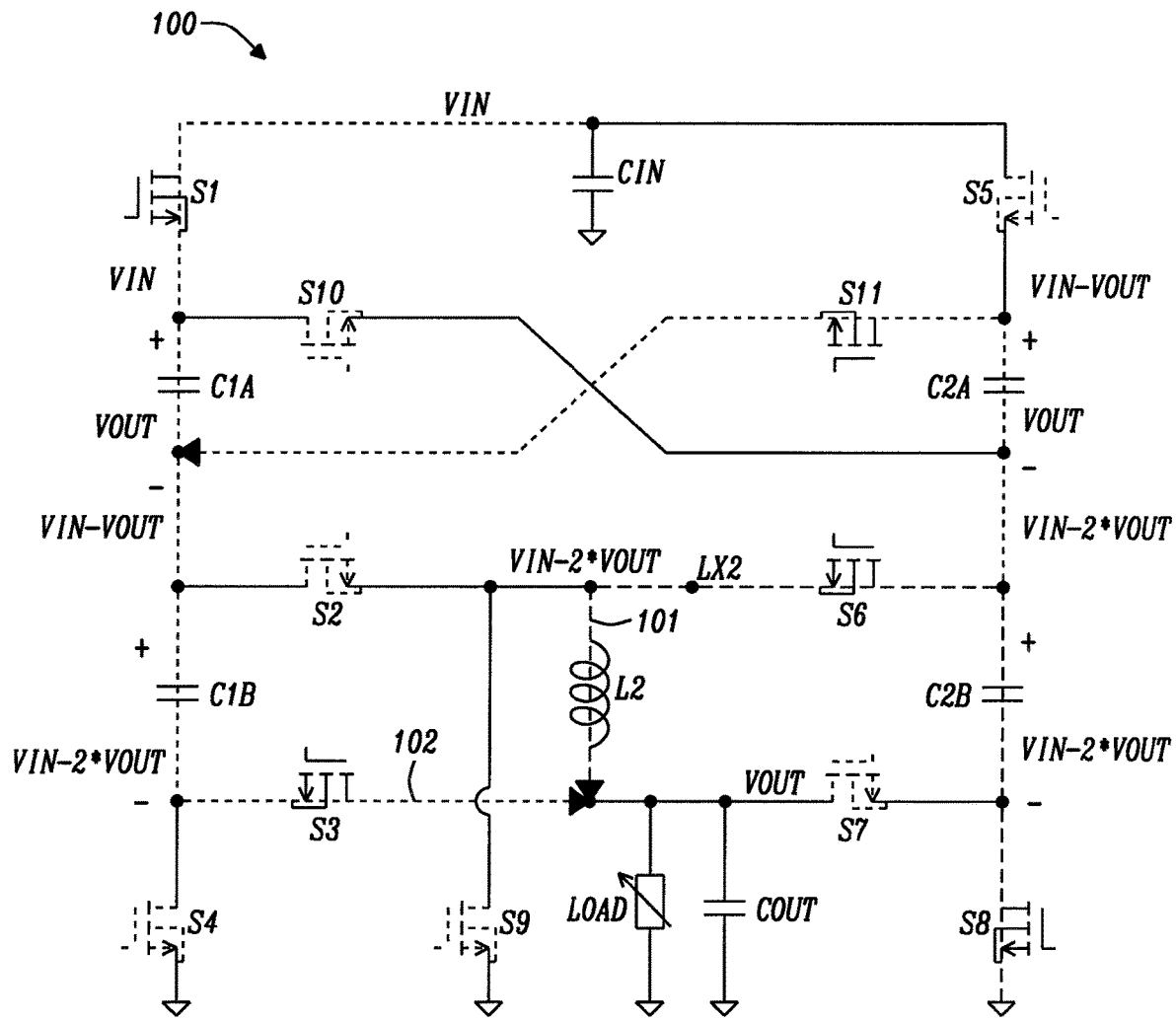
FIG. 3B illustrates the dual current paths of a second main state (referred to herein as D2) for relatively high conversion ratios.
Figure 3C:
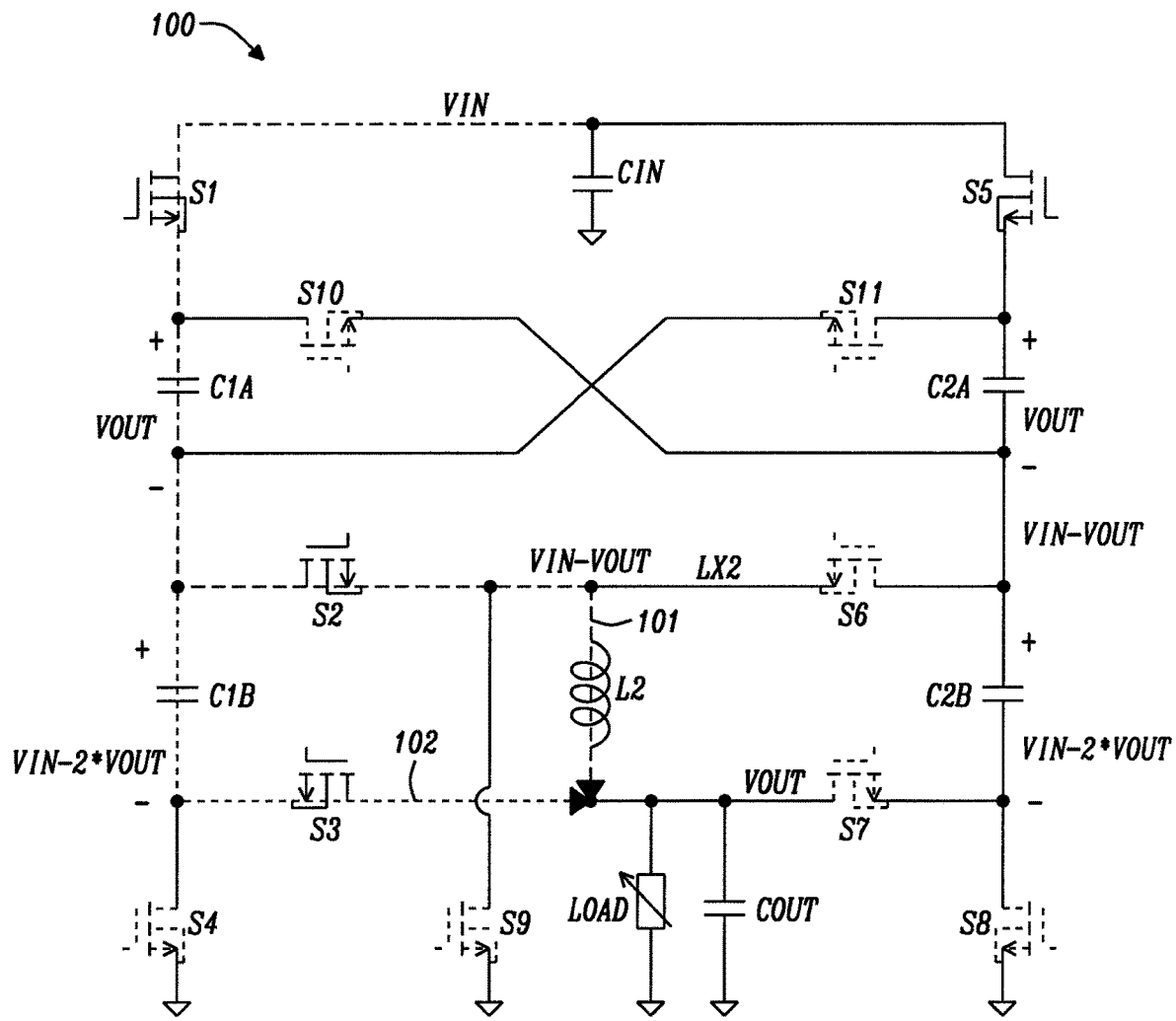
FIG. 3C illustrates the dual current paths of a first peak state (referred to herein as DP1) for relatively high conversion ratios.

During the state DP1 of FIG. 3C, the switches S4, S6, S7, S8, S9, S10 and S11 are open and the switches S1, S2, S3 and S5 are closed. The inductor L1, L2 is magnetized and the partial flying capacitor C1A is charged from the input of the voltage regulator 100 (via the main path 101). Furthermore, the partial flying capacitors C1A and C1B are charged from the input of the voltage regulator 100 (via the auxiliary path 102). The flying capacitors C2A and C2B are floating. The switch S5 may be maintained closed to set the input node of the flying capacitors C2A and C2B to a defined potential.

Figure 3D:
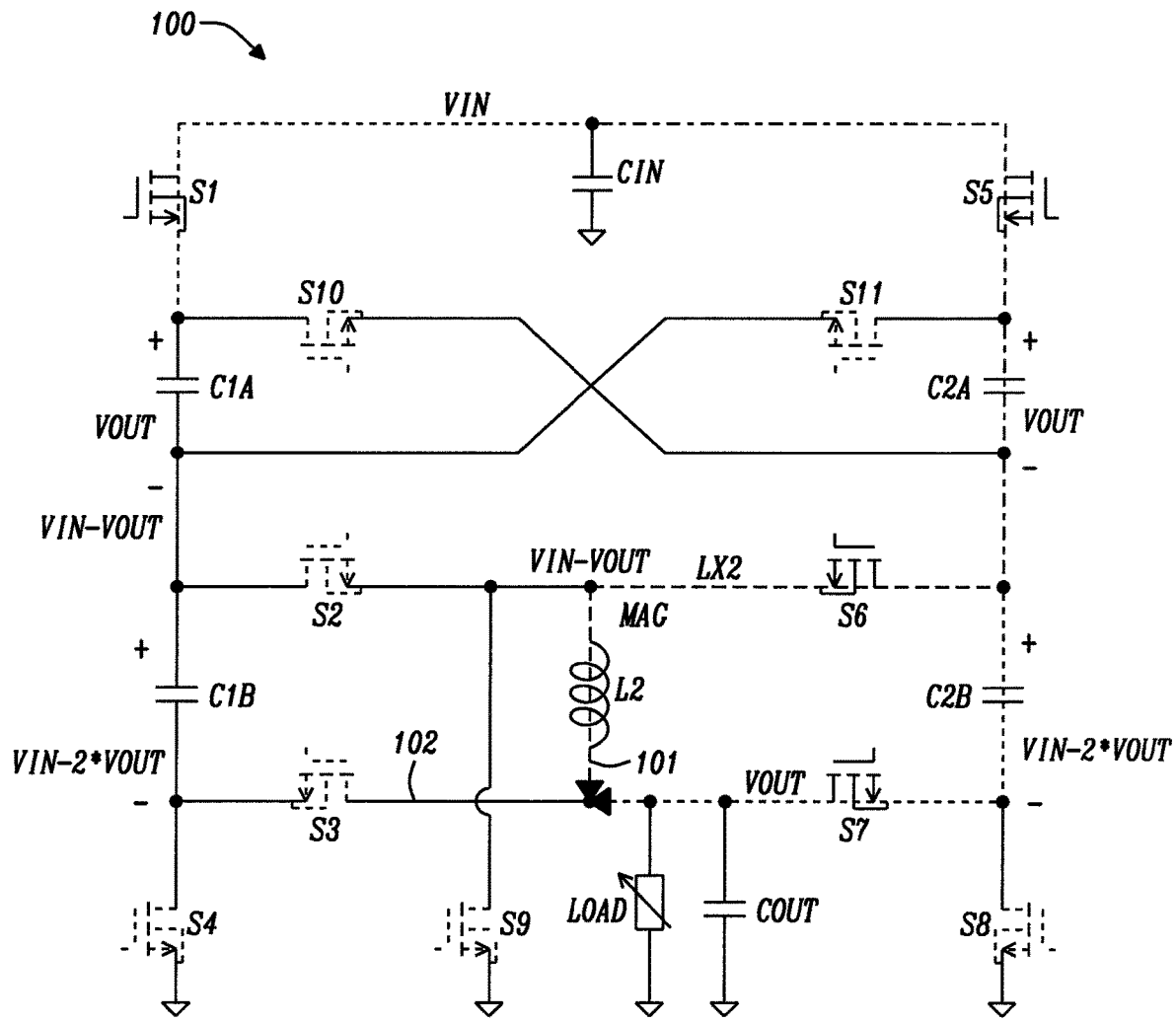
FIG. 3D illustrates the dual current paths of a second peak state (referred to herein as DP2) for relatively high conversion ratios.

In a complementary manner, during the state DP2 of FIG. 3D, the switches S2, S3, S4, S8, S9, S10 and S11 are open and the switches S1, S5, S6 and S7 are closed. The inductor L1, L2 is magnetized and the partial flying capacitor C2A is charged from the input of the voltage regulator 100 (via the main path 101). Furthermore, the partial flying capacitors C2A and C2B are charged from the input of the voltage regulator 100 (via the auxiliary path 102). The flying capacitors C1A and C1B are floating. The switch S1 may be maintained closed to set the input node of the flying capacitors C1A and C1B to a defined potential.

Region 2 operation cannot typically extend to conditions where VIN≤2*VOUT, because in such a case the DP1+DP2 intervals would have to be greater than 1, which is not possible. In other words, region 2 operation typically reaches maximum duty cycle operation when VIN=2*VOUT. In order for the voltage regulator 100 to regulate when VIN<2*VOUT, the voltage regulator 100 may undergo a distinctive change in operation, i.e., a mode change which will be discussed at a later section within this document.

Figure 3E:
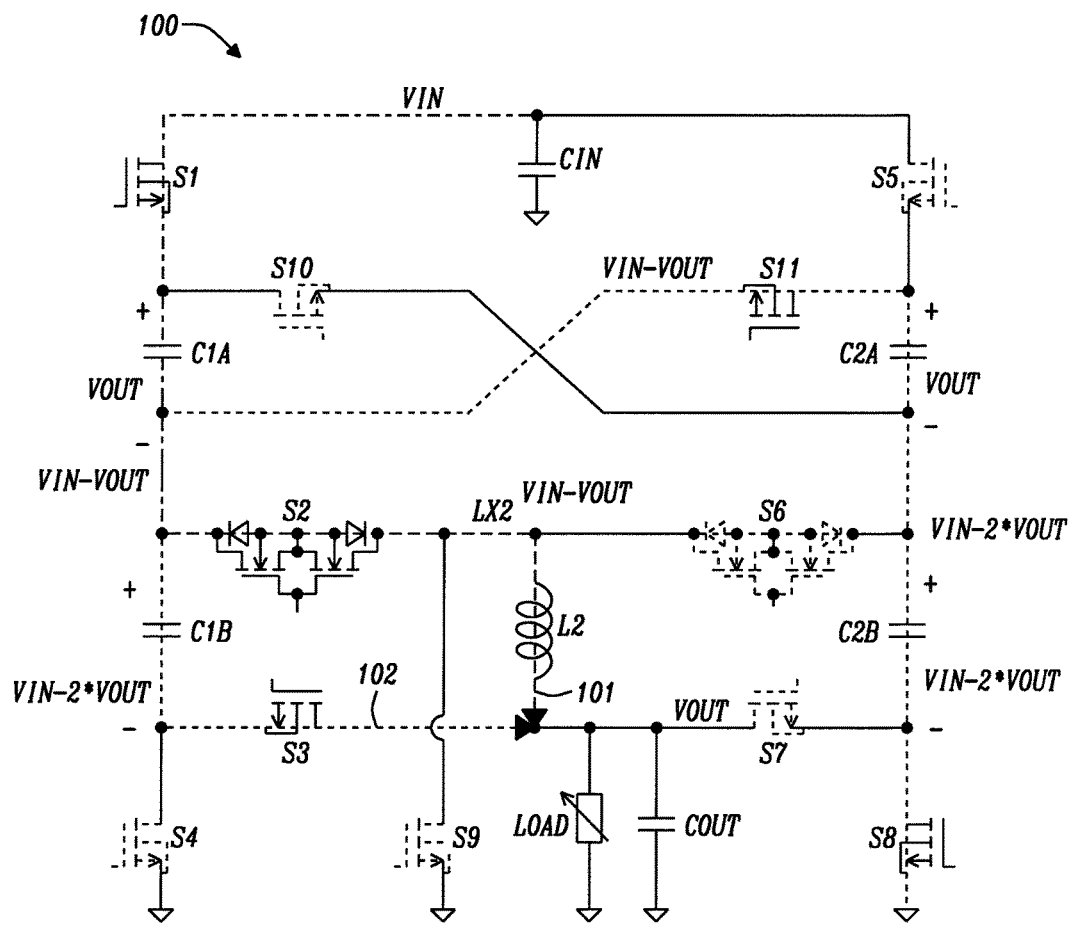
FIG. 3E illustrates the dual current paths of an alternative first peak state (referred to herein as DP1) for relatively high conversion ratios.
Figure 3F:
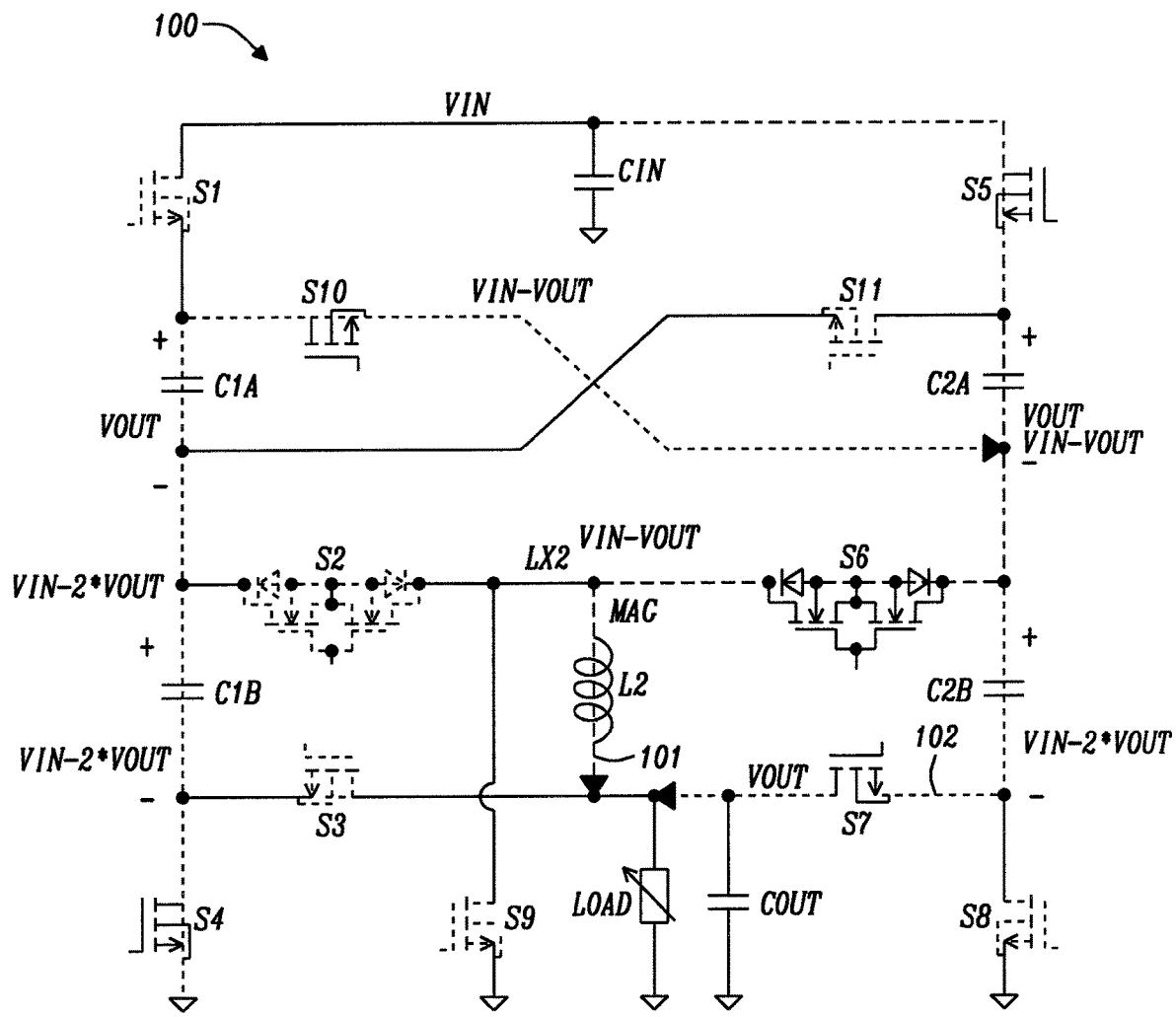
FIG. 3F illustrates the dual current paths of an alternative second peak state (referred to herein as DP2) for relatively high conversion ratios.

FIG. 3E shows an alternative DP1 state (as an alternative to the DP1 state of FIG. 3C), and FIG. 3F shows an alternative DP2 state (as an alternative to the DP2 state of FIG. 3D). In the alternative DP1 state the switches S8 and S11 are closed, thereby discharging the flying capacitors C2A and C2B, otherwise, the alternative DP1 state corresponds to the DP1 state of FIG. 3C. In a complementary manner, in the alternative DP2 state the switches S4 and S10 are closed, thereby discharging the flying capacitors C1A and C1B, otherwise, the alternative DP2 state corresponds to the DP2 state of FIG. 3D. By doing this, A-sec balance can be achieved in a reliable manner. However, back-to-back FETs (field effect transistors) may need to be used for switches S2 and S6 in the alternative DP1 and DP2 states, in order to avoid body diode conduction.

Figure 4A:
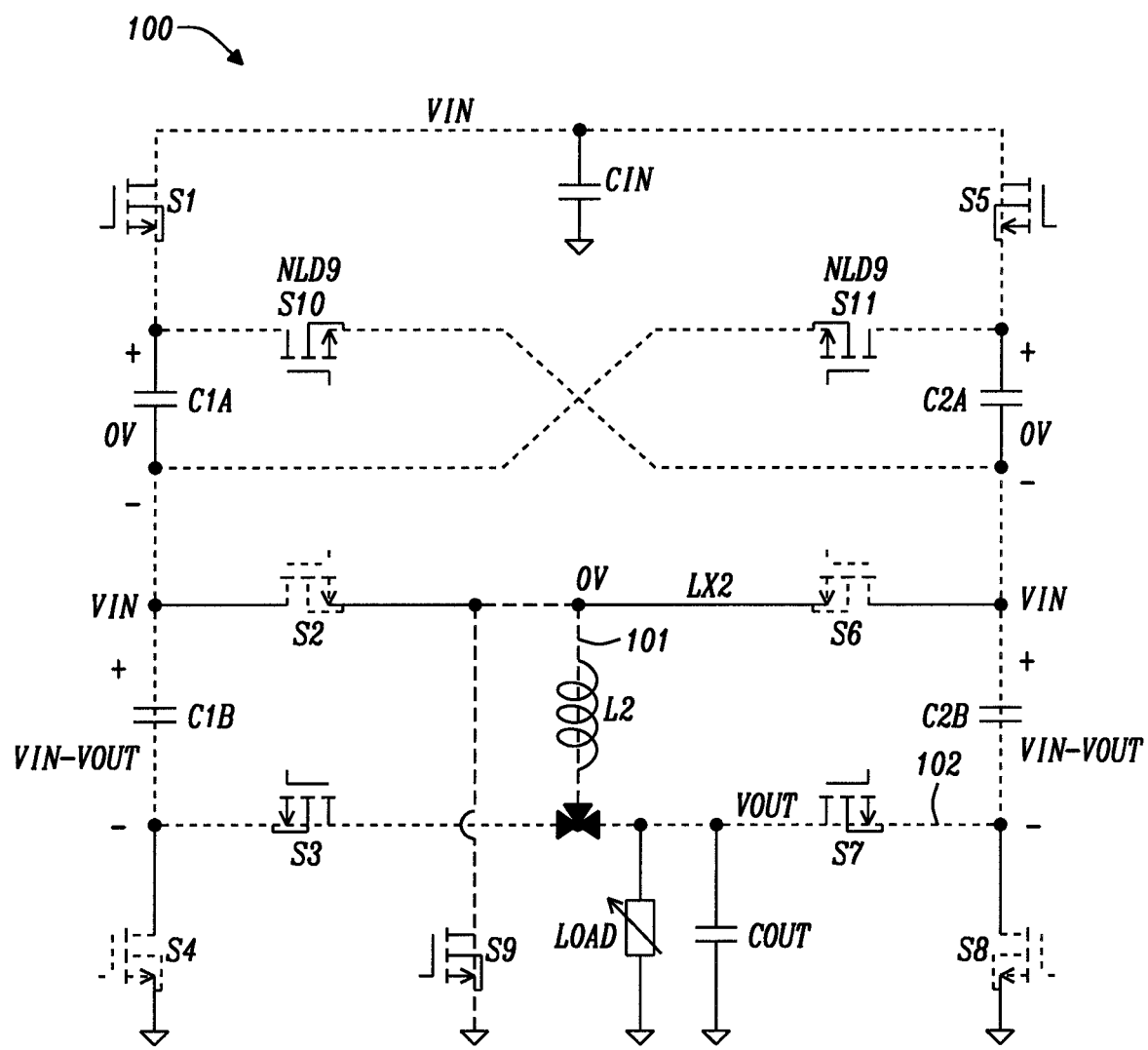
FIGS. 4A to 4C show different states for operating the power converter at conversion ratios greater than 0.5.
Figure 4B:
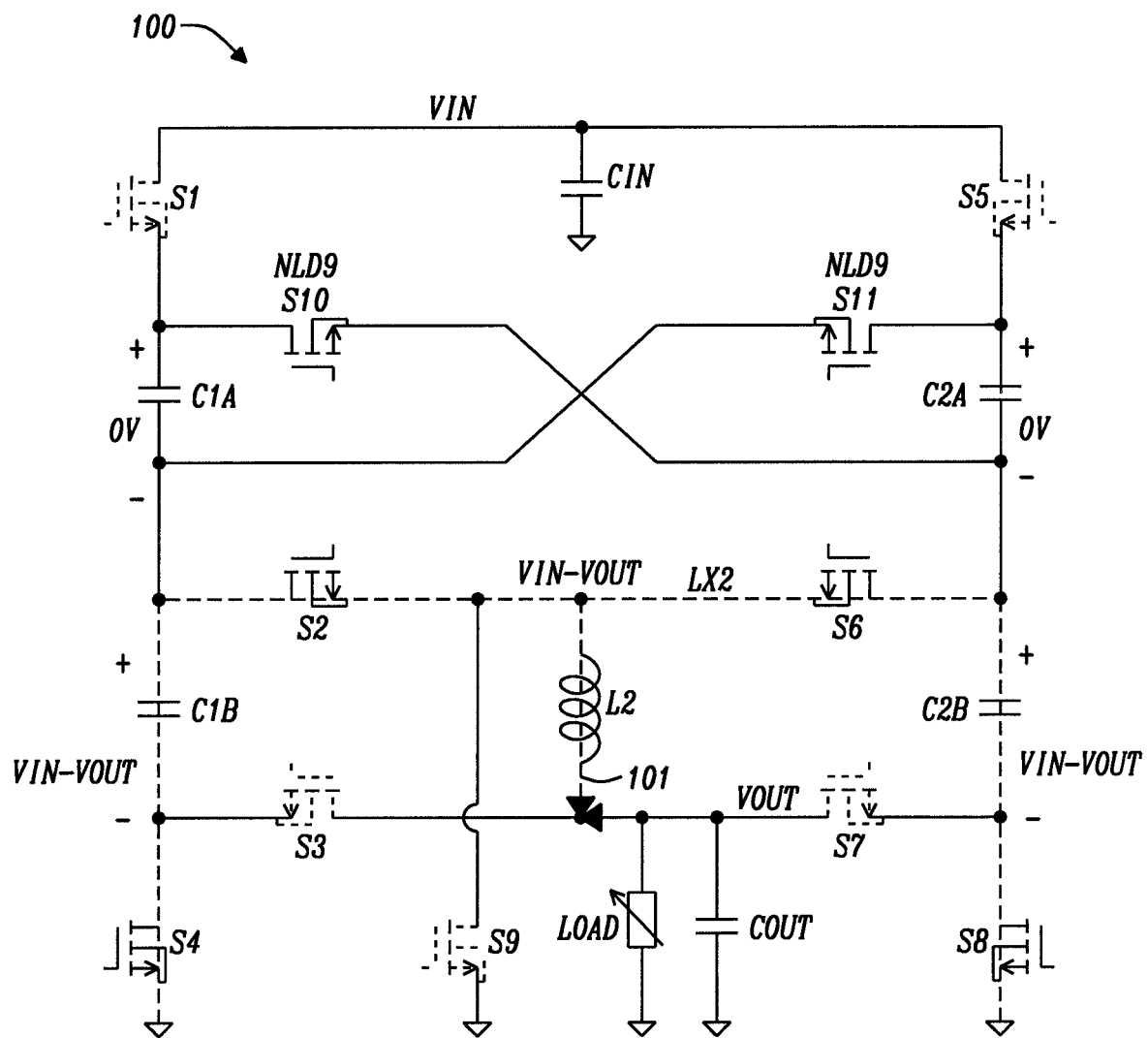
Figure 4C:
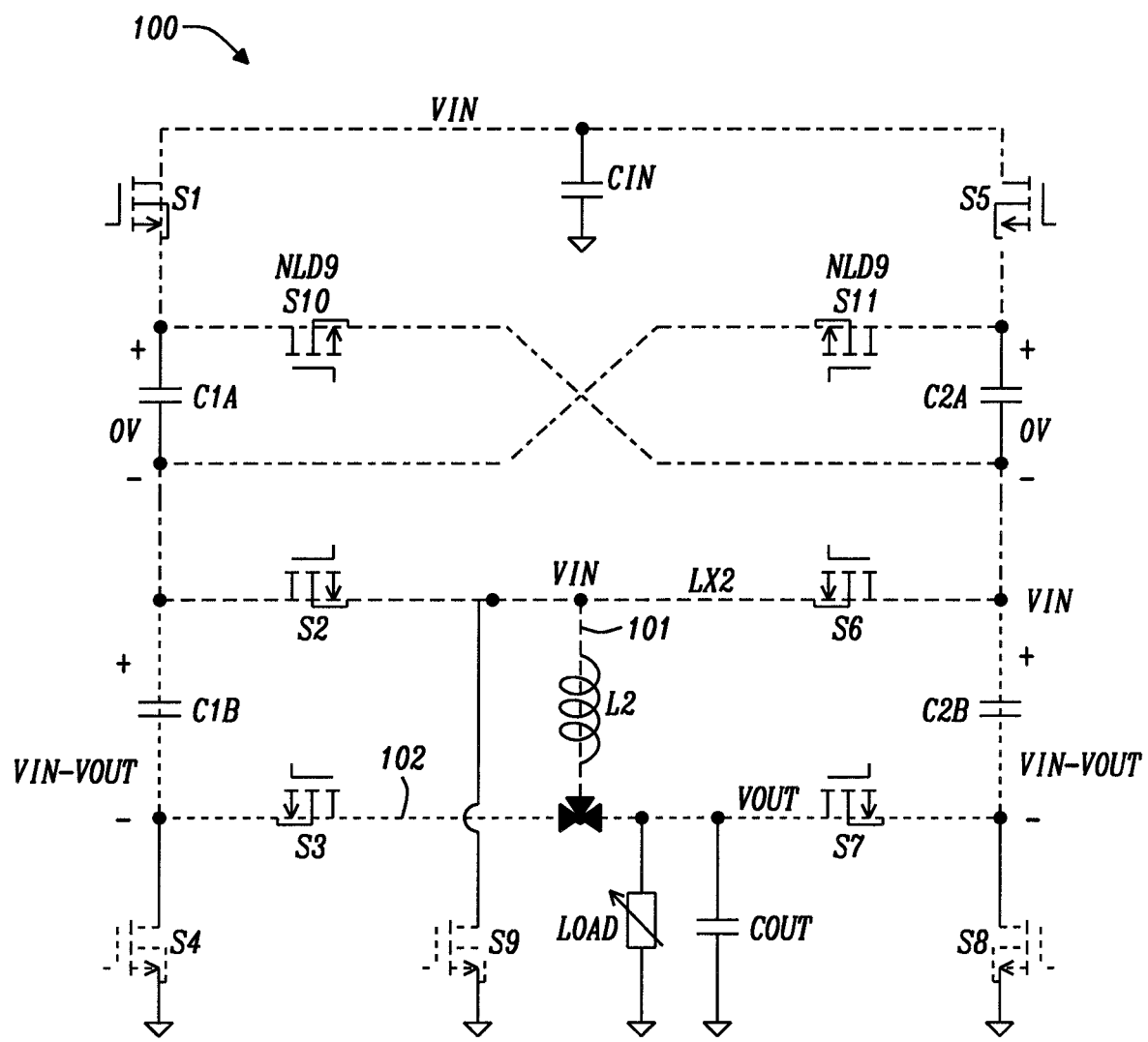

FIGS. 4A to 4C illustrate different states for operating the voltage regulator 100 in the region 3, for VIN≤2*VOUT, where 1≥CR≥0.5. FIG. 4A shows the state $D1_H$, FIG. 4B shows the state $D2_H$ and FIG. 4C shows the state $DP_H$. As can be seen, the switches S10 and S11 are constantly closed, thereby removing the influence of the flying capacitors C1A and C1B. The state sequence repeats according to the following pattern: $D1_H \to DP_H \to D2_H \to DP_H \to$ repeat, where $1 \geq D1_{PWM} \geq 0.5$;

$D2_{PWM} = D1_{PWM}$;

$D1_H = 1 - D1_{PWM}$;

$D1_H = D2_H$; and $DP_H = D1_{PWM} - 0.5$.

The conversion ratio (CR) may be given by $$\frac{V_{OUT}}{V_{IN}} = \frac{D1_{PWM}}{2 - D1_{PWM}}$$

so that 1≥CR≥0.33 for 1≥D1$_{PWM}$≥0.5.

In the D1$_H$ state (see FIG. 4A), the switches S2, S4, S6, S8 are open and the switches S1, S3, S5, S7, S9, S10, S11 are closed. The inductor L1, L2 is demagnetized and the flying capacitors C1B and C2B are charged. In the D2$_H$ state (see FIG. 4B), the switches S1, S3, S5, S7, S9 are open and the switches S2, S4, S6, S8, S10, S11 are closed. The inductor L1, L2 is demagnetized and the flying capacitors C1B and C2B are discharged. In the DP$_H$ state (see FIG. 4C), the switches S4, S8, S9 are open and the switches S1, S2, S3, S5, S6, S7, S10, S11 are closed. The inductor L1, L2 is magnetized and the flying capacitors C1B and C2B are charged.

Whenever the operating conditions change between regions 2 and 3, the voltage regulator 100 typically needs to undergo a mode transition, in order to maintain the output at the programmed level. This is because the split-capacitor mode in region 2 operates at a maximum duty cycle whenever VIN≤2*VOUT. A distinction between the split-capacitor mode in region 2 and the operation mode in region 3 is a difference in the steady-state voltages on the flying capacitors which are V(C1A)=V(C2A)=VOUT (in the split-capacitor mode) vs. V(C1A)=V(C2A)=0V in the region 3 operation mode; and V(C1B)=V(C2B)=VIN−2*VOUT (in the split-capacitor mode) vs. V(C1B)=V(C2B)=VIN−VOUT in the region 3 operation mode.

The regulator transition between the split-capacitor mode and the region 3 operation mode may be performed in two different ways depending on whether the input voltage VIN is increasing or decreasing (assuming the output voltage VOUT to be fixed).

If the initial operating conditions correspond to region 3, the regulator 100 operates in the region 3 operation mode (according to FIGS. 4A to 4C). If the input voltage VIN begins to increase such that VIN becomes slightly greater than 2*VOUT, switches S10 and S11 are held OFF, but the remaining power switches continue to sequence in the manner specified for the region 3 operation mode. This allows the flying capacitors C1A and C2A to charge up from 0V. Once it has been detected that V(C1A) and V(C2A) have charged up to —VOUT, the controller 120 begins to execute the switching sequence specified for the region 2 operation mode.

Figure 5:
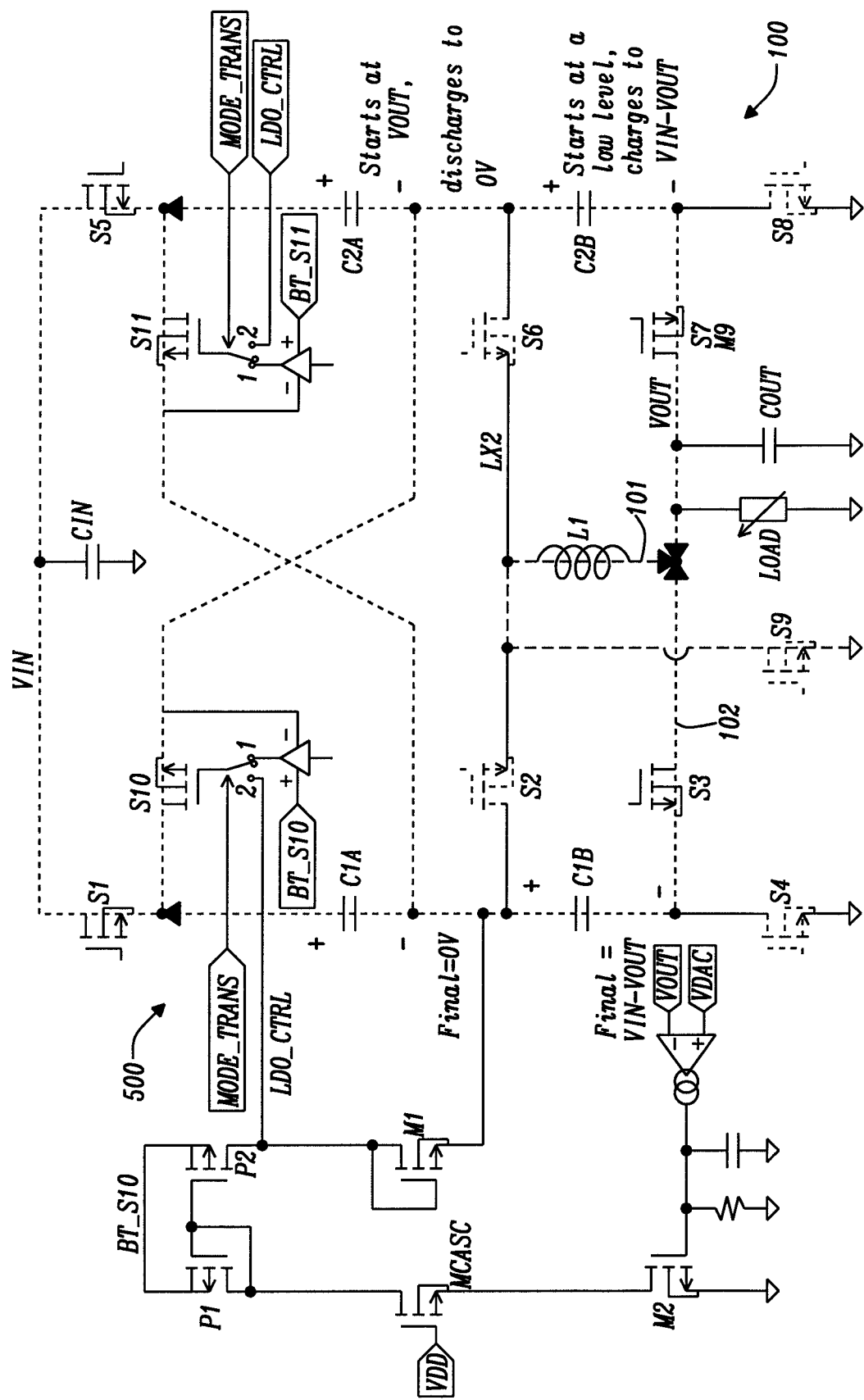
FIG. 5 shows circuitry for a transition mode.

If the initial operating conditions correspond to the region 1 or 2 operation, the regulator 100 operates in a split-capacitor mode according to FIGS. 2A to 2D or FIGS. 3A to 3F. If the input voltage VIN begins to decrease such that VIN becomes only slightly greater than 2*VOUT, the regulator 100 begins to transition to the region 3 operation mode. During this transition, the regulator 100 may operate in a linear (non-switching) manner. All but two of the power switches are held in either static ON or OFF states. Switches S10 and S11 may be operated in saturation, so they behave as voltage controlled current sources. This transition interval may be referred to as an "LDO Mode." FIG. 5 shows the power switch states and an example of the control for S10 and S11 during LDO Mode. In particular, FIG. 5 shows a linear controller 500 for controlling the switches S10 and S11 in a linear mode. As a result of this, the voltage across the flying capacitors C1A and C2A may be decreased to 0V.

In order to make a seamless transition from the split-capacitor mode to the region 3 operation mode, the charge on the flying capacitors should be redistributed in a controlled manner. More specifically, the flying capacitors C1A and C2A are discharged to 0V and the flying capacitors C1B and C2B are charged to VIN−VOUT. The LDO Mode (shown in FIG. 5) facilitates the charge redistribution process, while simultaneously maintaining the output voltage at the desired level by directing the flying capacitor charge redistribution energy to the load in a controlled manner. At the beginning of the transition, the inductor (indicated as L1 in FIG. 5) is allowed to demagnetize and causes its current to ramp down to 0A via the switch S9. The switch S9 may be ON during the inductor current ramp down interval and may be turned off, when 0A is detected. Alternatively, the switch S9 may be kept OFF during the entire transition so that the inductor current flows through the body diode of switch S9.

An example of a sequence of events leading to a mode transition is as follows: The CR increases to a value close to, but less than 0.5, causing the MODE_TRANS signal to be asserted. This in turn causes the gates of S10 and S11 to be disconnected from the gate drivers and to be connected to the output of the linear regulator (labeled "LDO_CTRL" in FIG. 5). The error amplifier depicted in FIG. 5 senses VOUT and compares it to the reference voltage, VDAC. The error amplifier controls the VGS of M1 (via M2, MCACS, P1 and P2) as well as the VGSs of S10 and S11. The arrangement of M1, S10 and S11 is analogous to a dual output current mirror, where M1 is the controlling FET. The error amplifier modulates the VGS of S10 and S11 to ensure that VOUT is maintained at the proper level. Once C1A and C2A discharge to a value close to 0V, the MODE_TRANS signal is de-asserted, the mode transition is completed, and the region 3 operation mode of the regulator 100 begins operation. Comparators, an ADC or other means may be used to detect the thresholds for MODE_TRANS assertion and de-assertion. The LDO Mode may be used for transition from low CR operation to high CR operation.

The advantage of the region 3 operation mode is that the regulator 100 can properly operate over a wide range of conversion ratios: ~VIN≥VOUT≥~0V. The maximum duty cycle operation occurs when VIN is close to VOUT. The region 3 operation mode is more efficient than a 2-level buck converter, but typically not as efficient as the split-capacitor mode for 0.5≥CR≥0. The switch state sequence for the region 3 operation mode may be dependent on the CR.

The regulator 100 may be operated in a start-up mode. If the output voltage VOUT is initially low (e.g., 0V) prior to the time that the regulator 100 becomes active, it may begin switching in the region 3 operation mode or in the split-capacitor mode. During the initial start-up interval (or during a soft-start phase), the output voltage VOUT may ramp up at a controlled rate until it reaches a pre-determined regulation threshold. If the input voltage VIN is greater than twice the target output voltage VOUT, then the regulator 100 may operate exclusively in the split-capacitor mode. However, if the input voltage VIN is less than twice the target output voltage VOUT, then a transition from the split-capacitor mode to the region 3 operation mode may occur, once the output voltage VOUT rises to a level that is greater than half of the input voltage VIN. In this case, it may be desirable to maintain the regulator operating in the region 3 operation mode during the entire operation (i.e., during both the soft-start interval and the steady-state operation).

The region 3 operation mode typically requires $D1_{PWM}$ to be greater than 0.5. This requirement prevents a CR starting at 0, which would be the case if the output is initially 0V. Therefore, a modification to the region 3 operation mode switch sequence may be used, in order to accommodate conversion ratios ranging from 0 to 0.33. The above-mentioned region 3 operation mode switch sequence may be replaced for start-up by a 2-step sequence: $D1_H \rightarrow D2_H \rightarrow$ (repeat) where $D1_H = 1 - D1_{PWM}$; $D2_H = D1_{PWM}$; and where $D2_{PWM}$ is not used. The states of the power switches for $D1_H$ and $D2_H$ are shown is FIGS. 4A and 4B, respectively.

The split-capacitor topology of FIG. 1A may be operated as an efficient step-up regulator, when the source and load (i.e., the input and the output of the regulator 100) are interchanged. Similar to the split-capacitor buck (i.e., step-down) operation, there are two different regions of operation:

boost region 1: 2*VIN≥VOUT≥VIN, i.e., 2≥CR≥1; and
boost region 2: VOUT≥2*VIN, i.e., CR>2.

For boost region 1 with 2*VIN≥VOUT≥VIN, where 2≥CR≥1, the four power switch states D1, D2, DV1 and DV2 (shown in FIGS. 6A, 6B, 6B and 6D, respectively) may be used to create a complete switching or operation cycle. The state sequence may comprise the following pattern: D1→DV1→D2→DV2→(repeat). The duty cycle control may be based on the interleaved, dual-ramp scheme as illustrated in FIG. 1B.

In the D1 state (shown in FIG. 6A), the switches S1, S3, S5, S6, S7, S9 may be open, and the switches S2, S4, S8, S10, S11 may be closed. The inductor L2 may be magnetized, and the flying capacitors C1B and C2B may be charged.

In the D2 state (shown in FIG. 6B), the switches S1, S2, S3, S5, S7, S9 may be open, and the switches S4, S6, S8, S10, S11 may be closed. The inductor L2 may be magnetized, and the flying capacitors C1B and C2B may be charged.

In the DV1 state (shown in FIG. 6C), the switches S2, S4, S7, S8, S9 may be open, and the switches S1, S3, S5, S6, S10, S11 may be closed. The inductor L2 may be demagnetized, and the flying capacitor C1B may be discharged, while the flying capacitor C2B is floating.

In the DV2 state (shown in FIG. 6D), the switches S3, S4, S6, S8, S9 may be open, and the switches S1, S2, S5, S7, S10, S11 may be closed. The inductor L2 may be demagnetized, and the flying capacitor C2B may be discharged, while the flying capacitor C1B is floating.

For boost region 2 with VOUT≥2*VIN, where CR≥2, four power switch states D1, D2, DP1 and DP2 may be used to create a complete switching cycle. The state sequence may comprise the following pattern: D1→DP1→D2→DP2→(repeat). $D1 = 1 - D1_{PWM}$; $D2 = 1 - D2_{PWM}$ and $D1_{PWM} = 1 - D2_{PWM}$.

Figure 6A:
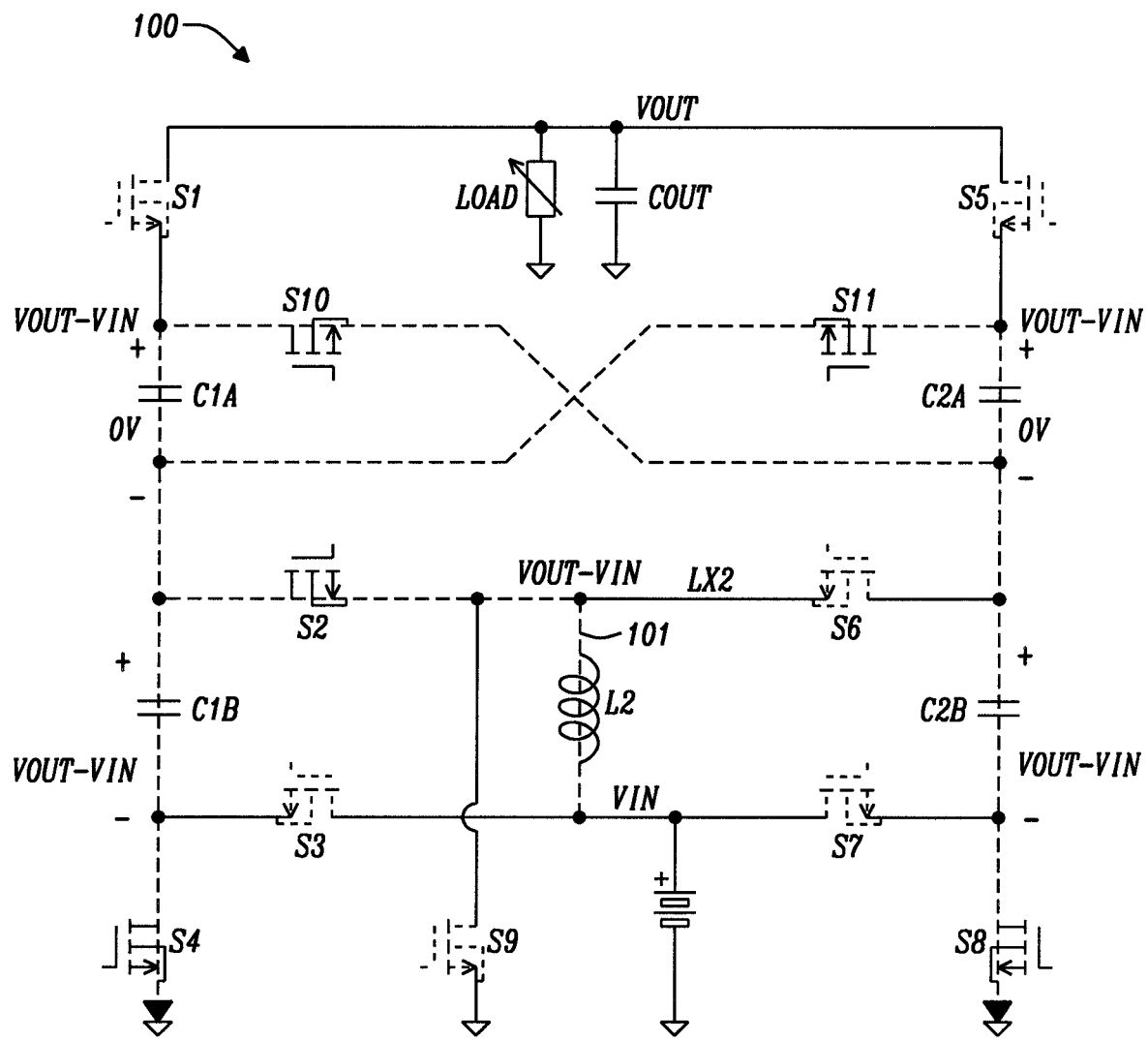
FIGS. 6A to 6F show different states for operating the power converter in a boost mode.
Figure 6B:
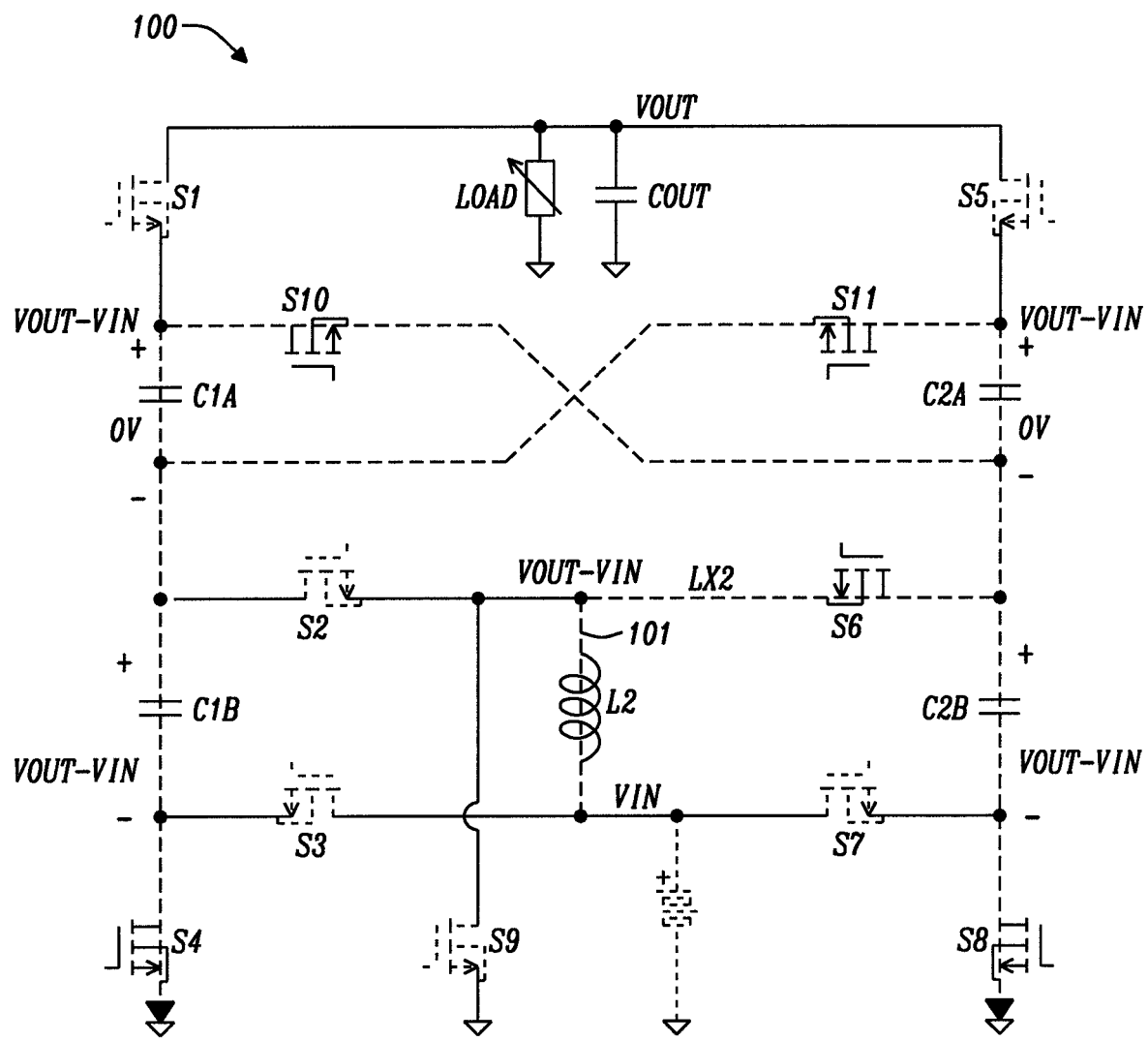
Figure 6C:
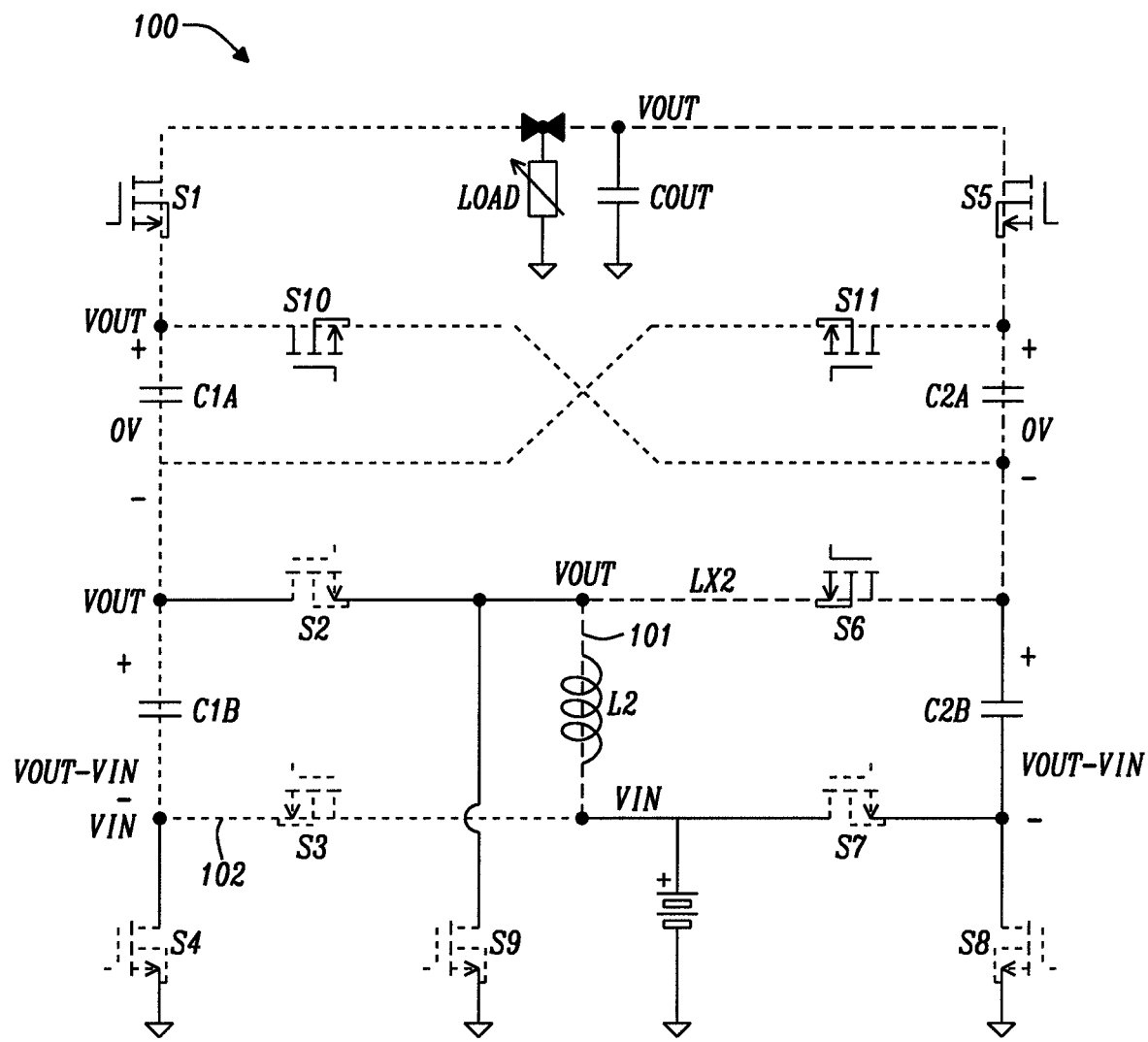
Figure 6D:
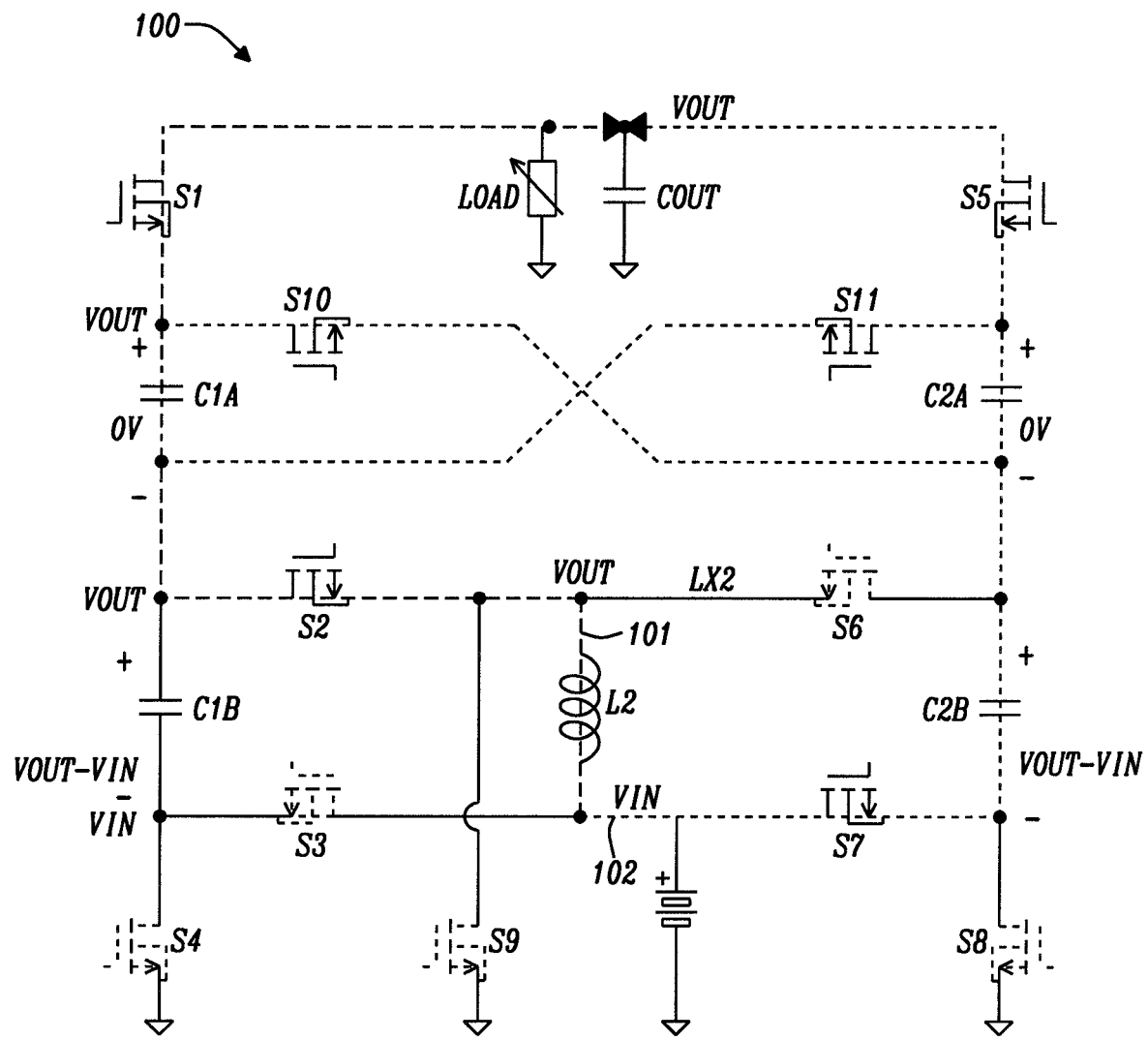
Figure 6E:
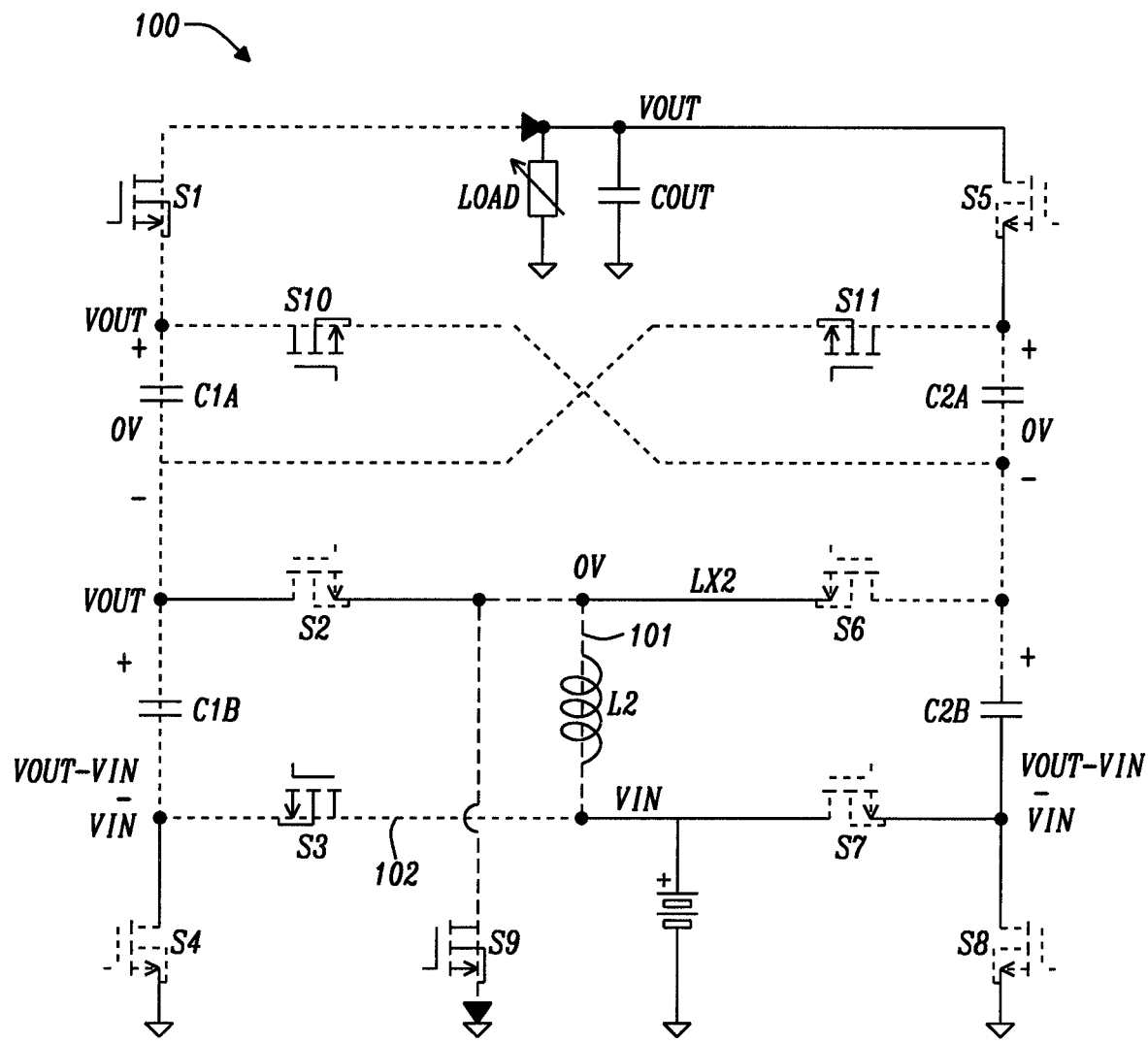
Figure 6F:
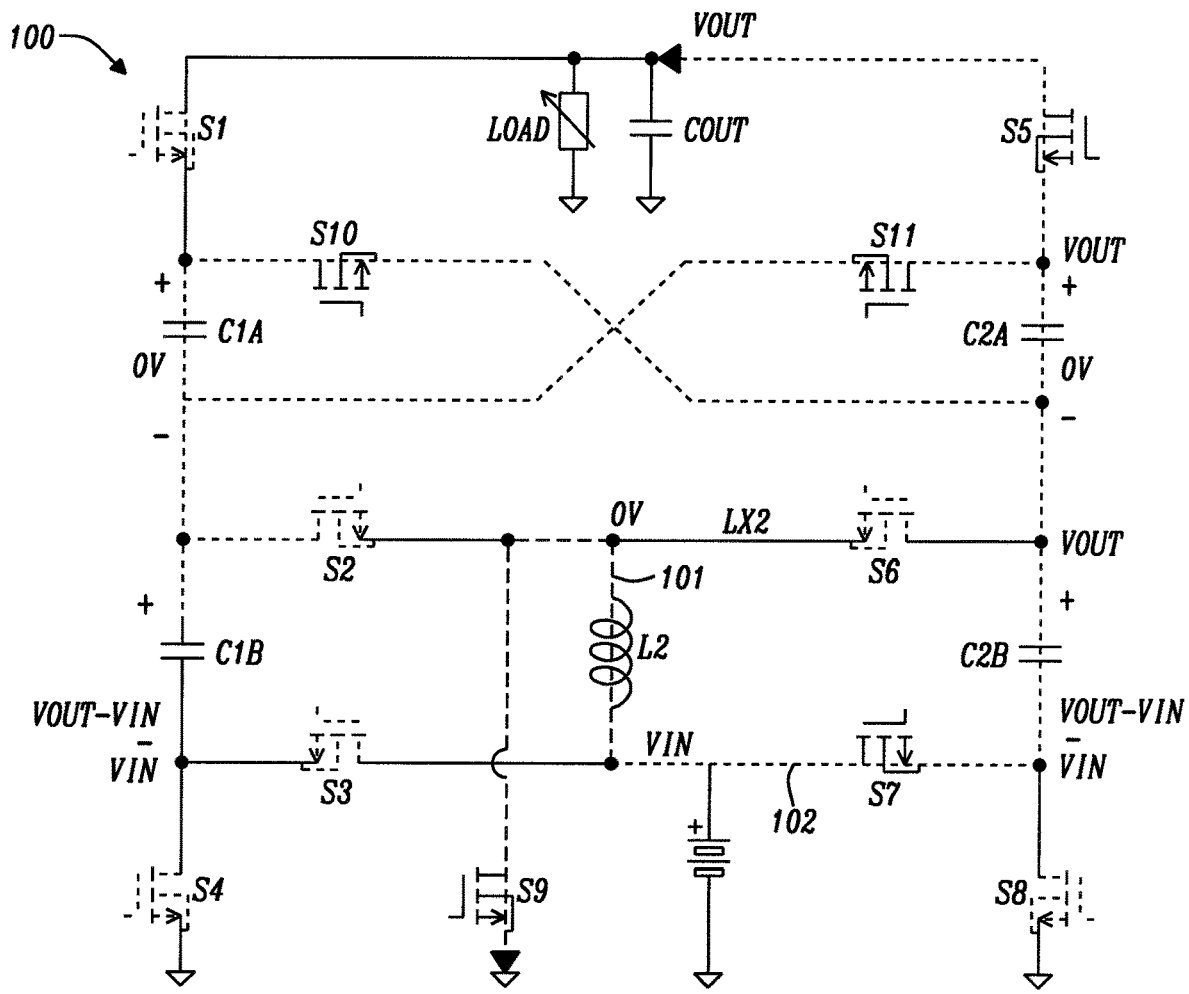

The switch states D1 and D2 are the same as for region 1 operation (shown in FIGS. 6A and 6B, respectively). The switch states DP1 and DP2 are shown in FIGS. 6E and 6F, respectively. The inductor L2 is demagnetized during the D1 and D2 states, because the flying capacitor voltage ($V_{FLYCAP} = VIN - VOUT$) is greater than VIN. Therefore, the DP switch states DP1 and DP2 may be used to magnetize the inductor L2.

In the DP1 state (shown in FIG. 6E), the switches S2, S4, S6, S5, S7, S8 may be open, and the switches S1, S3, S9, S10, S11 may be closed. The inductor L2 may be magnetized, and the flying capacitor C1B may be discharged, while the flying capacitor C2B is floating.

In the DP2 state (shown in FIG. 6F), the switches S1, S2, S3, S4, S6, S8 may be open, and the switches S5, S7, S9, S10, S11 may be closed. The inductor L2 may be magnetized, and the flying capacitor C2B may be discharged, while the flying capacitor C1B is floating.

It should be noted that in the FIGS. 2 to 6, power switches which are open are indicated in a light and/or transparent manner. On the other hand, power switches which are closed are indicated in a fully drawn manner. Furthermore, it should be noted that in the present document, the inductor may be indicated as L1 or L2.

Figure 7:
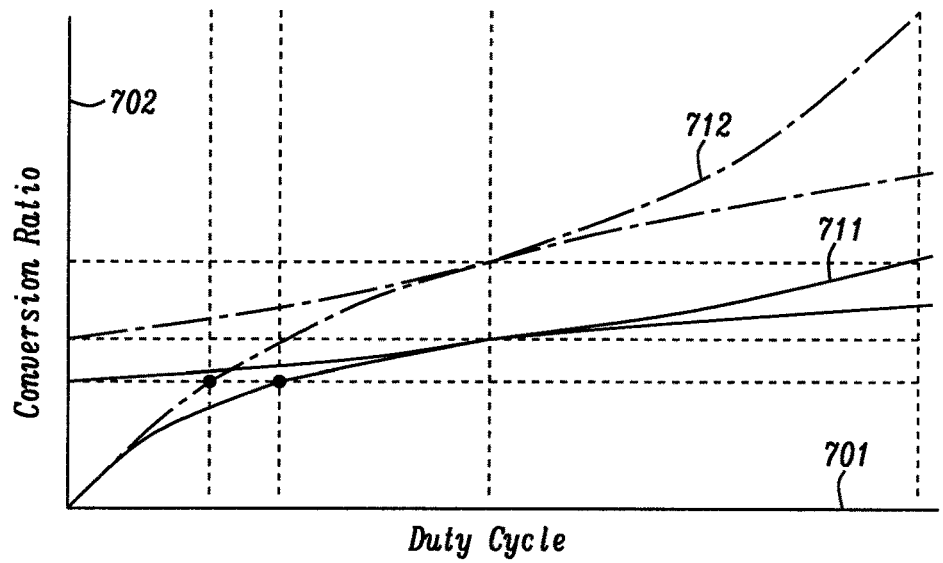
FIG. 7 illustrates relationships between conversion ratio and duty cycle.

FIG. 7 shows the conversion ratio (CR) 702 as a function of the duty cycle $D1_{PWM}$ 701 for the split-capacitor mode (curve 711) and for the region 3 operation mode (curve 712). It can be seen that for CR>0.5 a transition from the split-capacitor mode to the region 3 operation mode is performed. It can be shown that for CR=0.25, a 25% reduction of the ripple current may be achieved in the split-capacitor mode compared to the region 3 operation mode. Since the core losses associated with the inductor L2 are dependent on the current ripple, the split-capacitor mode leads to a significant improvement in overall regulator efficiency.

It should be noted that the effective switching frequency of the regulator 100 may be twice the clock frequency that is used for the timing of the ramp signals that are used to generate the duty cycle PWM pulses of FIGS. 1B and 1C. In addition, the duty cycle of the regulator's switch node LX2 may be twice the duty cycle of $D1_{PWM}$.

It can be shown that the dual-path current (through the auxiliary path 102) for the split-capacitor mode exceeds that of the region 3 operation mode for all values of the duty cycle $D1_{PWM}$. This results in a reduction of the power loss associated with the DCR (DC-resistance) of the inductor, because the average inductor current is reduced in proportion to the increase of the dual-path current. In addition, the effective inductance is increased, when reducing the average inductor current due to the bias current dependency. As a result of this, reduced average inductor current leads to reduced current ripple and reduced core loss.

As indicated above, the voltage regulator 100 of FIG. 1A shifts the conversion ratio for peak efficiency operation from CR=0.5 to 0.33. This is beneficial for applications that require a typical converter output voltage VOUT that is more than two times smaller than the input voltage VIN. Following a mode transition into the region 3 operation mode conversion ratios CR>0.5 are supported, but the efficiency is sacrificed in this conversion range, because resonant switching may not be performed at CR=0.5.

Figure 8:
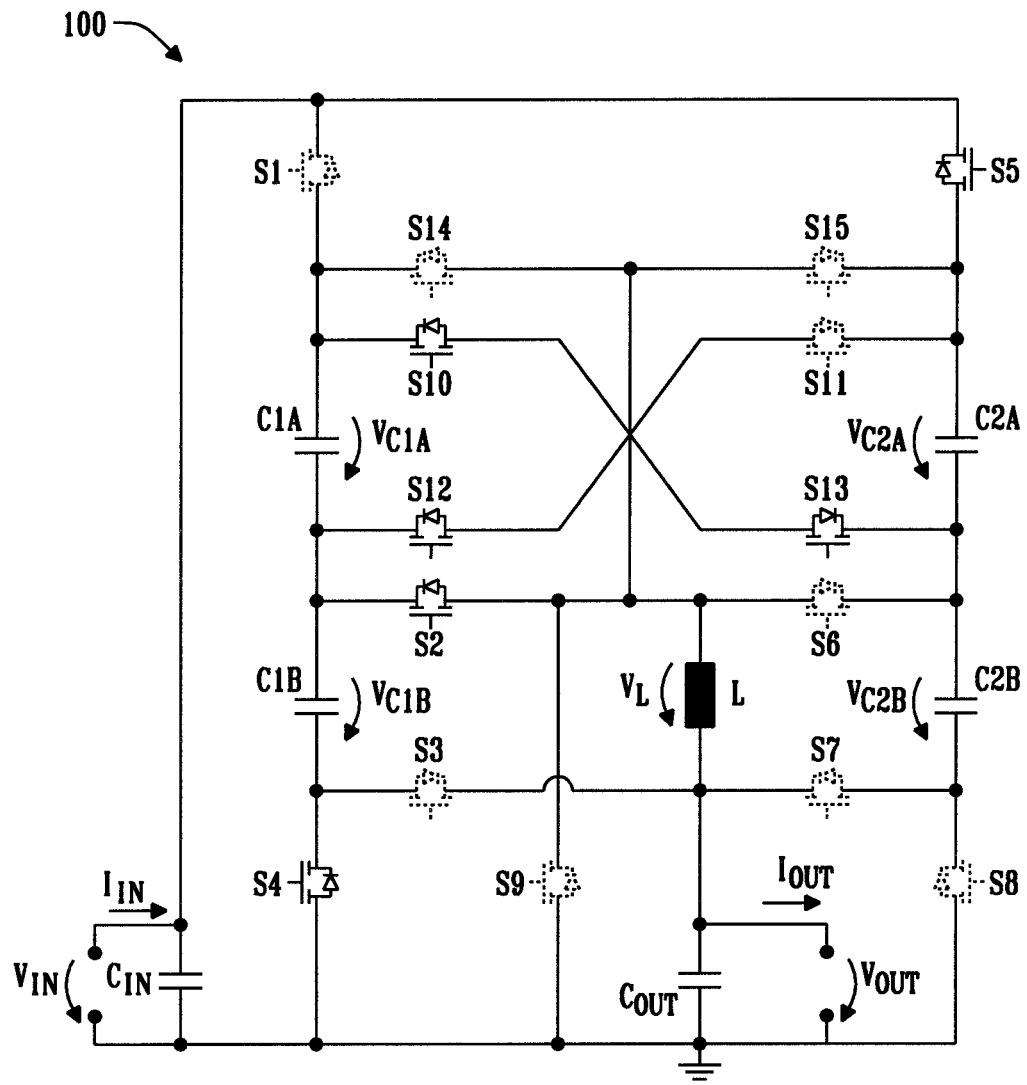
FIG. 8 shows a power converter which allows for peak efficiencies at CR=0.33 and CR=0.5.

FIG. 8 shows a voltage regulator 100 with an additional efficiency optimum at the converter conversion ratio CR=0.5. The regulator 100 of FIG. 8 may be used for applications where the converter efficiency at conversion ratios CR>0.5 is important as well.

Figure 9A:
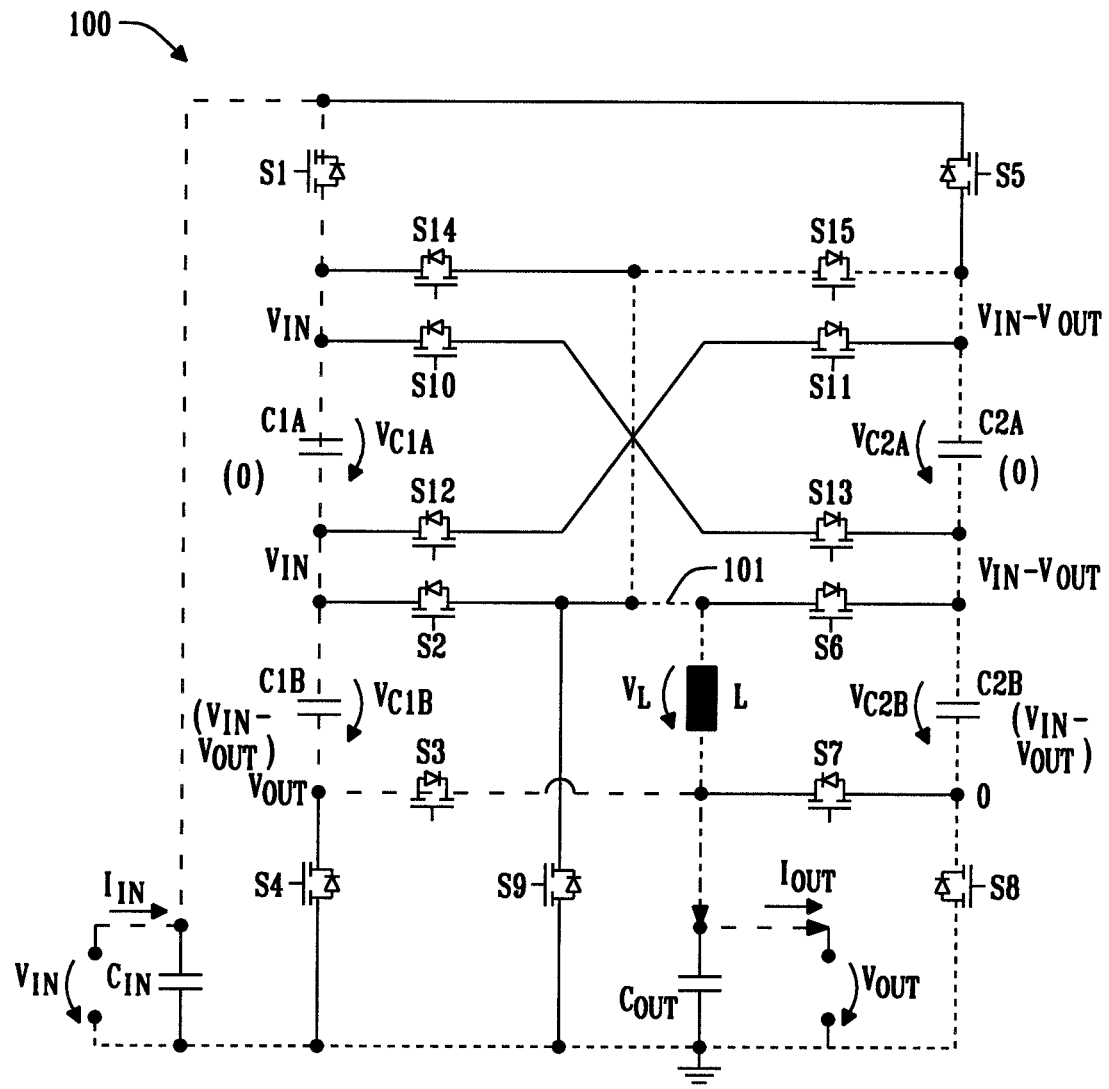
FIGS. 9A to 9F illustrate different states of the power converter of FIG. 8.
Figure 9B:
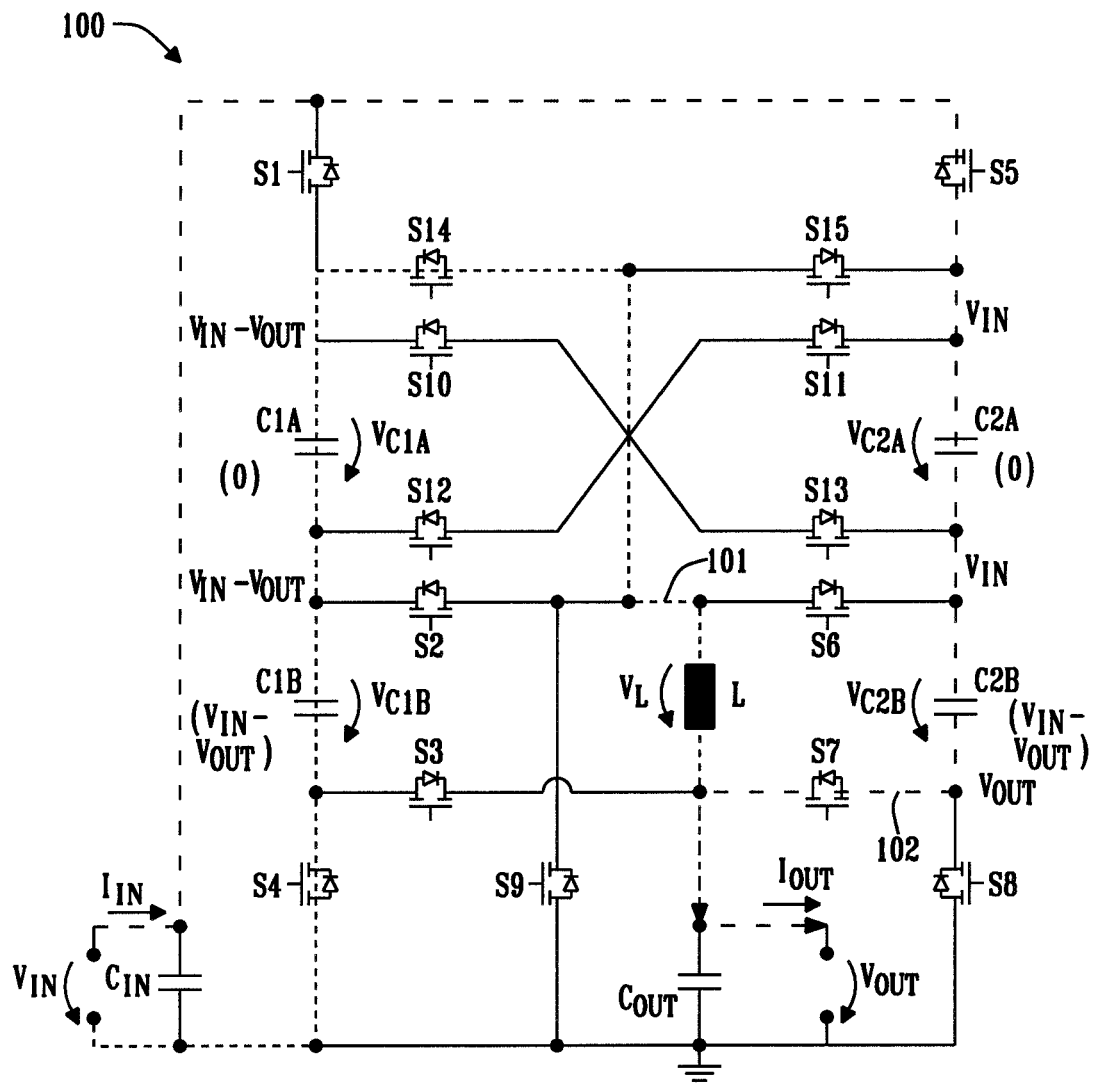
Figure 9C:
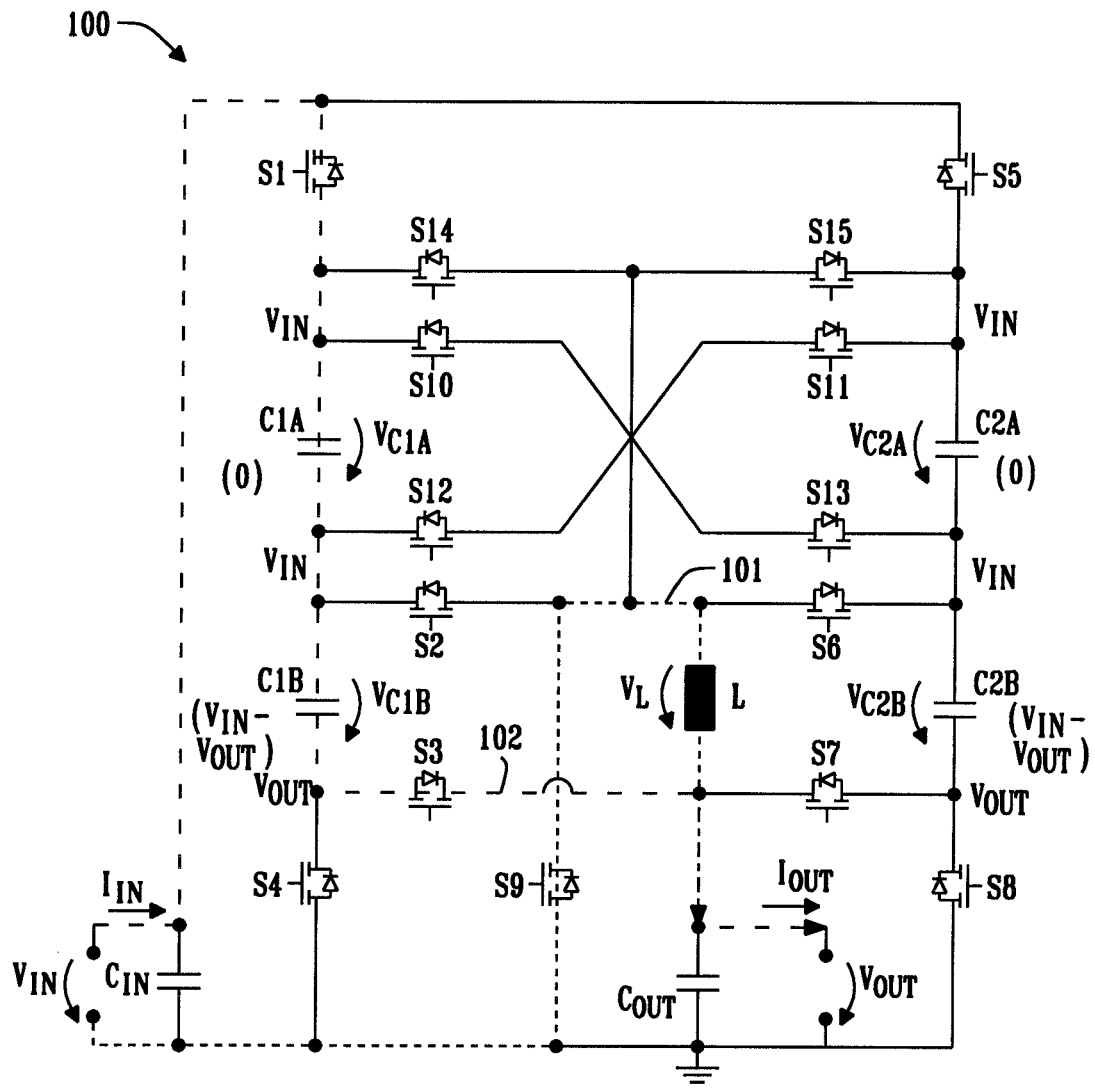
Figure 9D:
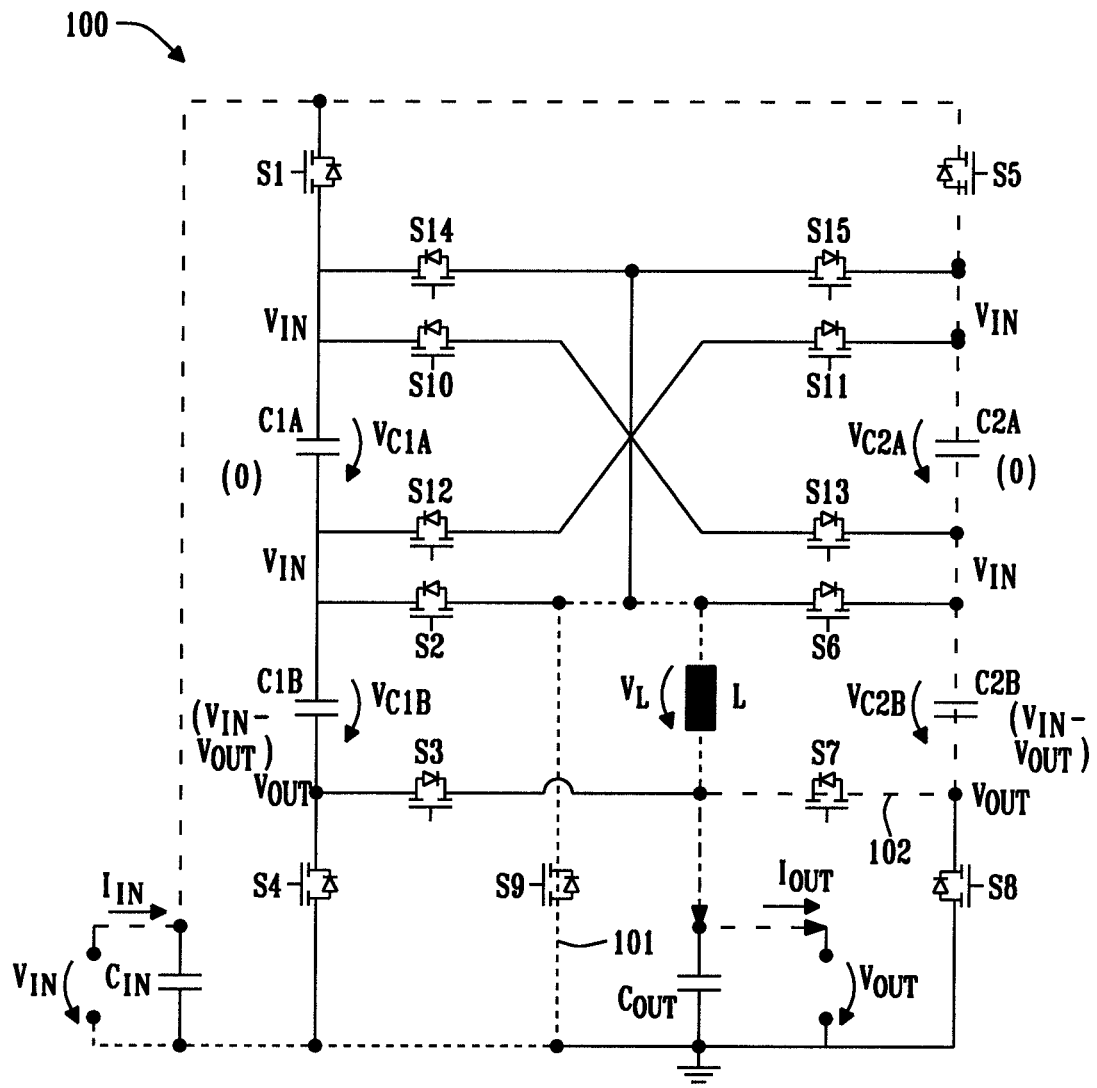

The connection paths containing the switches S10 and S11, respectively, are provided with a back-to-back isolation by adding the switches S12 and S13 in an anti-serial arrangement with respect to the switches S10 and S11, respectively. Furthermore, switches S14 and S15 are added as illustrated in FIG. 8. The switches S12 and S13 may be always on and the switches S14 and S15 may be always off, during the split-capacitor operation mode, and by consequence do not increase the switching loss of the regulator and/or converter 100. As soon as the converter 100 has exited the split-capacitor operation mode (using the above-mentioned transition scheme), the converter 100 of FIG. 8 may be operated in an interleaved manner with the main operation states $D1_{H2}$ and $D2_{H2}$, which are illustrated in FIGS. 9A and 9B, respectively.

During transition, the flying capacitors C1A and C2A are discharged to 0V and the flying capacitors C1B and C2B are charged to VIN−VOUT. For target conversion ratios CR<0.5, additional states $DV1_{H2}$ and $DV2_{H2}$ according to FIGS. 9C and 9D, respectively, may be inserted into the switching sequence, so that the state sequence may be $D1_{H2} \rightarrow DV1_{H2} \rightarrow D2_{H2} \rightarrow DV_{2H} \rightarrow$(repeat).

In the state $D1_{H2}$ (see FIG. 9A), the switches S2, S4, S5, S6, S7, S9, S10, S11, S12, S13, S14 are open, and the switches S1, S3, S8, S15 are closed. In the state $D2_{H2}$ (see FIG. 9B), the switches S1, S2, S3, S6, S8, S9, S10, S11, S12, S13, S15 are open, and the switches S4, S5, S7, S14 are closed.

In the state $DV1_{H2}$ (see FIG. 9C), the switches S2, S4, S5, S6, S7, S8, S10, S11, S12, S13, S14, S15 are open, and the switches S1, S3, S9 are closed. In the state $DV2_{H2}$ (see FIG. 9D), the switches S1, S2, S3, S4, S6, S8, S10, S11, S12, S13, S14, S15 are open, and the switches S5, S8, S9 are closed.

Figure 9E:
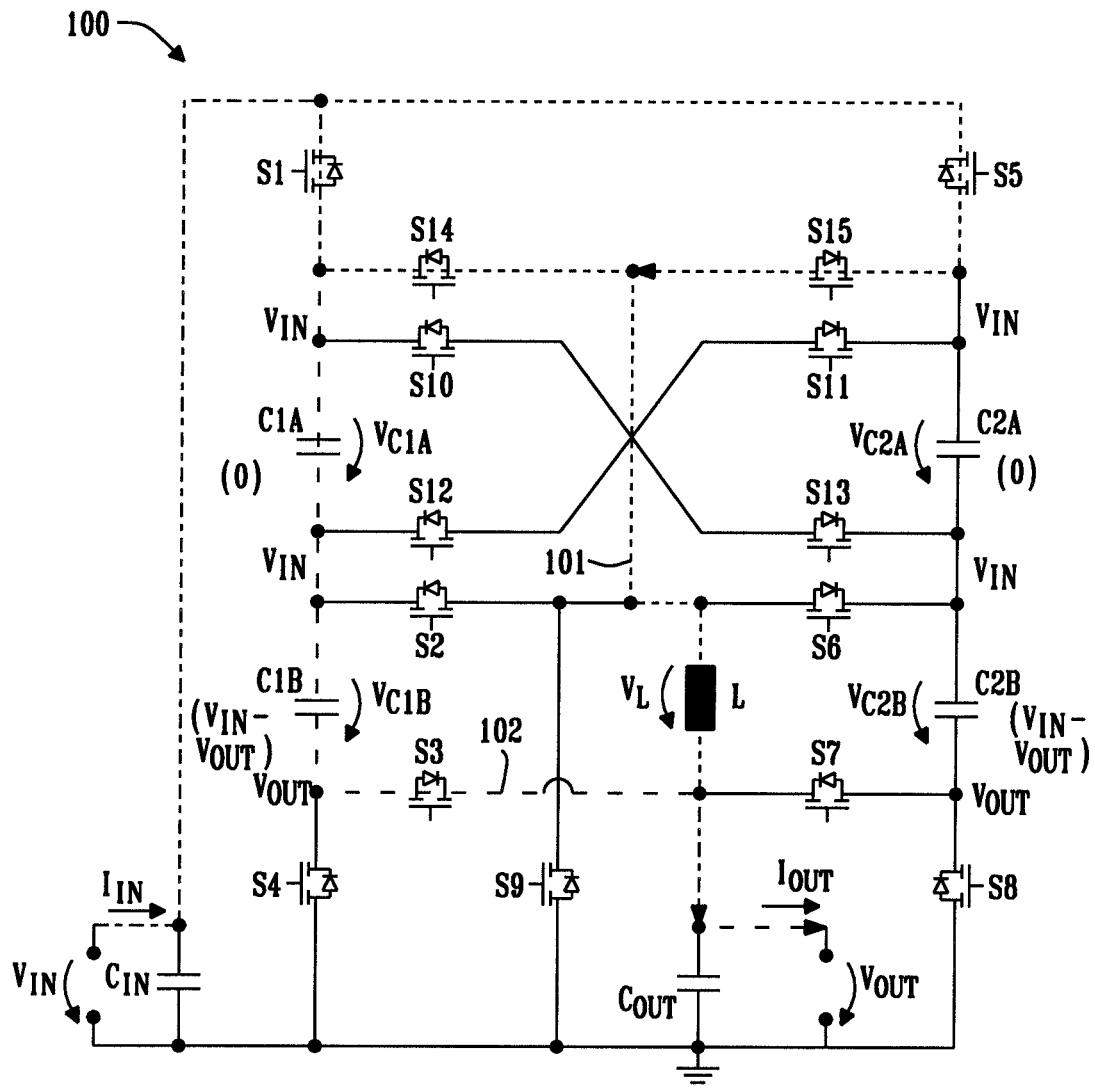
Figures 9F, 10:
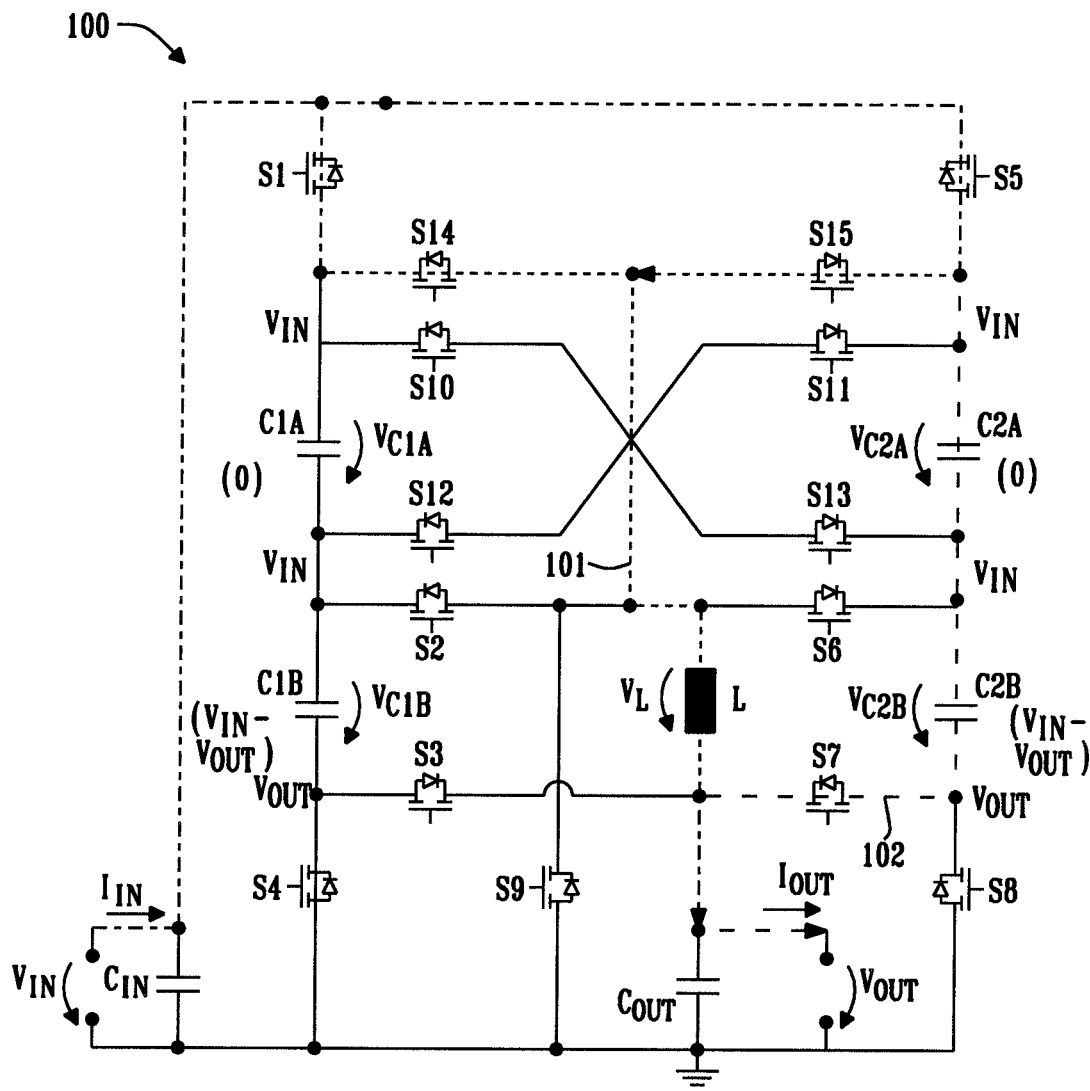
FIG. 10 shows a flow chart of an example method for operating a voltage regulator.

For target conversion ratios CR>0.5 states $DP1_{H2}$ and $DP2_{H2}$ according to FIGS. 9E and 9F, respectively, may be inserted into the switching sequence, so that the state sequence may be $D1_{H2} \rightarrow DP1_{H2} \rightarrow D2_{H2} \rightarrow DP2_{H2} \rightarrow$(repeat).

In the state $DP1_{H2}$ (see FIG. 9E), the switches S2, S4, S6, S7, S8, S9, S10, S11, S12, S13 are open, and the switches S1, S3, S5, S14, S15 are closed. In the state $DP2_{H2}$ (see FIG. 9F), the switches S2, S3, S4, S6, S8, S9, S10, S11, S12, S13 are open, and the switches S1, S5, S7, S14, S15 are closed.

The switches S10-S13 remain off within the switching sequences in region 3 operation and consequently do not add any switching losses. Asymmetries in the circuitry (or in the timing of the states $D1_{H2}$ & $D2_{H2}$) may cause a drift of the voltages across the flying capacitors. To maintain the voltage across the flying capacitor C1A at zero the switch S2 may be closed for a relatively short interval within the switching state $D2_{H2}$. By doing this, the voltage across the flying capacitor C1B is automatically driven to VIN−VOUT. In a similar manner, the switch S6 may be closed for a relatively short interval within the switching state $D1_{H2}$ to maintain the voltage across the flying capacitor C2A at zero. By doing this, the voltage across the flying capacitor C2B is automatically driven to VIN−VOUT. As a result of this, the regulation quality may be increased.

At the conversion ratio CR=0.5 the converter 100 of FIG. 8 operates in resonant mode with zero voltage across the inductor. Hence, the converter 100 of FIG. 8 enables peak efficiency operation at CR=0.5 and at CR=0.33.

FIG. 10 shows a flow chart of an example method 1000 for operating a power converter 100. The method 1000 may be executed by a control unit 120. The power converter 100 is configured to convert electrical power at an input voltage VIN at an input of the power converter 100 to electrical power at an output voltage VOUT at an output of the power converter 100.

The power converter 100 comprises a first upper capacitor C1A and a first lower capacitor C1B, which are coupled with one another via a first mid node (wherein the first mid node is located directly between the first upper capacitor C1A and the first lower capacitor C1B). Furthermore, the power converter 100 comprises a second upper capacitor C2A and a second lower capacitor C2B, which are coupled with one another via a second mid node (wherein the second mid node is located directly between the second upper capacitor C2A and the second lower capacitor C2B). The power converter 100 further comprises an inductor L1, L2 (notably a single inductor) and a set of power switches S1-S15.

The method 1000 comprises controlling 1001 the set of power switches S1-S15 such that during an operation cycle (notably each operation cycle) the power converter 100 is operated in a first main state D1 and in a second main state D2 in a mutually exclusive manner.

A state may comprise a first current path 101 which provides current to the output and a second current path 102 which provides additional current to the output, thereby increasing the overall current at the output. The first current path 101 typically passes through the inductor L1, L2 of the power converter 100. The second current path 102 typically bypasses the inductor L1, L2 (i.e., does not pass through any inductor L1, L2 of the power converter 100).

The power converter 100 may exhibit within the first main state D1 a first current path 101 from ground through the first lower capacitor C1B, through the inductor L1, L2 to the output. Furthermore, the power converter 100 may exhibit within the first main state D1 a second current path 102 with a sub-path from the input (of the power converter 100), through the second upper capacitor C2A, through the second lower capacitor C2B to the output (of the power converter 100), and with a sub-path from ground through the first lower capacitor C1B, through the first upper capacitor C1A, through the second lower capacitor C2B to the output.

The power converter 100 may exhibit within the second main state D2 a first current path 101 from ground, through the second lower capacitor C2B, through the inductor L1, L2 to the output. Furthermore, the power converter 100 may exhibit within the second main state D2 a second current path 102 with a sub-path from the input, through the first upper capacitor C1A, through the first lower capacitor C1B to the output, and with a sub-path from ground, through the second lower capacitor C2B, through the second upper capacitor C2A, through the first lower capacitor C1B to the output.

It should be noted that the components which are listed to be on a current path 101, 102 may be the only components which are on the current path 101, 102 (apart from one or more (closed) power switches S1-S15). Furthermore, the different components on a current path 101, 102 may be located on the current path 101, 102 in the given order (given within the definition of the respective current path).

Hence, a power converter 100 configured to convert electrical power at an input voltage VIN at an input of the power converter 100 to electrical power at an output voltage VOUT at an output of the power converter 100 is described. The power converter 100 comprises a first upper capacitor C1A and a first lower capacitor C1B, which are (directly) coupled with one another via a first mid node. Furthermore, the power converter 100 comprises a second upper capacitor C2A and a second lower capacitor C2B, which are (directly) coupled with one another via a second mid node. In addition, the power converter 100 comprises an inductor L1, L2, and a set of power switches S1-S15.

The set of power switches S1-S15 may comprise a first power switch S1 with an input node (directly) coupled to the input of the power converter 100 and an output node (directly) coupled to an input node of the first upper capacitor C1A and to an input node of a tenth power switch S10. Alternatively, or in addition, the set of power switches S1-S15 may comprise a second power switch S2 with an input node (directly) coupled to the first mid node and an output node (directly) coupled to an input node LX2 of the inductor L1, L2. Alternatively, or in addition, the set of power switches S1-S15 may comprise a third power switch S3 with an input node (directly) coupled to an output node of the first lower capacitor C1B and with an output node (directly) coupled to the output of the power converter 100. Alternatively, or in addition, the set of power switches S1-S15 may comprise a fourth power switch S4 with an input node (directly) coupled to the output node of the first lower capacitor C1B and with an output node (directly) coupled to ground. Alternatively, or in addition, the set of power switches S1-S15 may comprise a fifth power switch S5 with an input node (directly) coupled to the input of the power converter 100 and an output node (directly) coupled to an input node of the second upper capacitor C2A and to an input node of an eleventh power switch S11. Alternatively, or in addition, the set of power switches S1-S15 may comprise a sixth power switch S6 with an input node (directly) coupled to the second mid node and an output node (directly) coupled to the input node LX2 of the inductor L1, L2. Alternatively, or in addition, the set of power switches S1-S15 may comprise a seventh power switch S7 with an input node (directly) coupled to an output node of the second lower capacitor C2B and with an output node (directly) coupled to the output of the power converter 100. Alternatively, or in addition, the set of power switches S1-S15 may comprise an eighth power switch S8 with an input node (directly) coupled to the output node of the second lower capacitor C2B and with an output node (directly) coupled to ground. Alternatively, or in addition, the set of power switches S1-S15 may comprise a ninth power switch S9 with an input node (directly) coupled to the input node LX2 of the inductor L1, L2 and with an output node (directly) coupled to ground, Alternatively, or in addition, the set of power switches S1-S15 may comprise the tenth power switch S10 with an output node (directly) coupled to the second mid node. Alternatively, or in addition, the set of power switches S1-S15 may comprise the eleventh power switch S11 with an output node (directly) coupled to the first mid node.

It should be noted that the term "coupled" may refer to two entities being "directly coupled" (without any further intermediate component). Hence, in the present document the term "coupled" may be replaced by the term "directly coupled".

An output node of the first upper capacitor C1A may be (directly) coupled to an input node of the first lower capacitor C1B at the first mid node. An output node of the second upper capacitor C2A may be (directly) coupled to an input node of the second lower capacitor C2B at the second mid node. An output node of the inductor L1, L2 may be (directly) coupled to the output of the power converter 100.

Alternatively, or in addition, the set of power switches S1-S15 may comprise a twelfth switch S12 in an anti-serial arrangement with the eleventh switch S11, which are located between the input node of the second upper capacitor C2A and the first mid node. Alternatively, or in addition, the set of power switches S1-S15 may comprise a thirteenth switch S13 in an anti-serial arrangement with the tenth switch S10, which are located between the input node of the first upper capacitor C1A and the second mid node. Alternatively, or in addition, the set of power switches S1-S15 may comprise a fourteenth switch S14 with an input node (directly) coupled to the input node of the first upper capacitor C1A and an output node (directly) coupled to the input node LX2 of the inductor L1, L2. Alternatively, or in addition, the set of power switches S1-S15 may comprise a fifteenth switch S15 with an input node (directly) coupled to the input node of the second upper capacitor C2A and an output node (directly) coupled to the input node LX2 of the inductor L1, L2.

In addition, the power converter may comprise a (analog and/or digital) control unit 120 configured to control the set of power switches S1-S15. The power converter 100 may be operated in a sequence of operation cycles. Each operation cycle may have a pre-determined (constant) cycle duration. Each operation cycle may comprise a sequence of different states of the power converter. The power converter 100 may be operated within a state in an exclusive manner (i.e., one state at a time).

An operation cycle may comprise a first main state D1 and a second main state D2. Within the first main state D1, the power converter 100 may exhibit a first current path 101 from ground through the first lower capacitor C1B, through the inductor L1, L2 to the output. Furthermore, within the first main state D1, the power converter 100 may exhibit a second current path 102. The second current path 102 may comprise a sub-path from the input, through the second upper capacitor C2A, through the second lower capacitor C2B to the output. Furthermore, the second current path 102 may comprise a sub-path from ground through the first lower capacitor C1B, through the first upper capacitor C1A, through the second lower capacitor C2B to the output.

Within the second main state D2, the power converter 100 may exhibit a first current path 101 from ground, through the second lower capacitor C2B, through the inductor L1, L2 to the output. Furthermore, within the second main state D2, the power converter 100 may exhibit a second current path 102. The second current path 102 may comprise a sub-path from the input, through the first upper capacitor C1A, through the first lower capacitor C1B to the output. Furthermore, the second current path 102 may comprise a sub-path from ground, through the second lower capacitor C2B, through the second upper capacitor C2A, through the first lower capacitor C1B to the output.

The control unit 120 may be configured to control the set of power switches S1-S15 during a sequence of subsequent operation cycles, wherein each operation cycle comprises a (exactly one) first main state D1 and a (exactly one) second main state D2. Alternatively, or in addition, the control unit 120 may be configured to control the set of power switches S1-S15 such that the first state and the second state are repeated in an alternating manner, and/or such that the duty cycle and/or the duration of the first main state D1 is equal to the duty cycle and/or the duration of the second main state D2.

The repeated operation of the power converter 100 in different states may be used to regulate the output voltage VOUT to a target voltage and/or to regulate the conversion ratio to a target conversion ratio. In particular, the control unit 120 may be configured to regulate the output voltage VOUT to one fourth or to one third or to half of the input voltage VIN. Alternatively, or in addition, the control unit 120 may be configured to set, in particular to regulate, the target conversion ratio between the input voltage VIN and the output voltage VOUT, in particular to a target conversion ratio of 0.25 or to a target conversion ratio of 0.33 or to a target conversion ratio of 0.5. In particular, the control unit 120 may be configured to adjust the duty cycle of the first main state D1 and/or of the second main state D2 to modify the conversion ratio between the input voltage VIN and the output voltage VOUT.

The control unit 120 may be configured to control the set of power switches S1-S15 such that during an operation cycle the power converter 100 is operated in a first valley state DV1 and in a second valley state DV2, which in particular lie, individually, in between the first main state D1 and the second main state D2 and/or in between the second main state D2 and the first main state D1. In particular, a state sequence may comprise or may consist of the first main state D1, followed by a first valley state DV1, followed by the second main state D2 and followed by a second valley state DV2 (forming an operation cycle), e.g., if the target conversion ratio lies between 0 and 0.33.

Within the first valley state DV1, the power converter 100 may exhibit a first current path 101 from ground through the inductor L1, L2 to the output. Furthermore, within the first valley state DV1, the power converter 100 may exhibit a second current path 102 from the input through the first upper capacitor C1A, through the first lower capacitor C1B to the output.

Within the second valley state DV2, the power converter 100 may exhibit a first current path 101 from ground through the inductor L1, L2 to the output. Furthermore, within the second valley state DV2, the power converter 100 may exhibit a second current path 102 from the input through the second upper capacitor C2A, through the second lower capacitor C2B to the output.

The control unit 120 may be configured to control the set of power switches S1-S15 such that during an operation cycle the power converter 100 is operated in a first peak state DP1 and in a second peak state DP2, which in particular lie, individually, in between the first main state D1 and the second main state D2 and/or in between the second main state D2 and the first main state D1. In particular, a state sequence may comprise or may consist of the first main state D1, followed by a first peak state DP1, followed by the second main state D2 and followed by a second peak state DP2 (forming an operation cycle), e.g., if the target conversion ratio lies between 0.33 and 0.5.

Within the first peak state DP1, the power converter 100 may exhibit a first current path 101 from the input, through the first upper capacitor C1A, through the inductor L1, L2 to the output. Furthermore, within the first peak state DP1, the power converter 100 may exhibit a second current path 102 from the input through the first upper capacitor C1A, through the first lower capacitor C1B to the output.

Within the second peak state DP2, the power converter 100 may exhibit a first current path 101 from the input, through the second upper capacitor C2A, through the inductor L1, L2 to the output. Furthermore, within the second peak state DP2, the power converter 100 may exhibit a second current path 102 from the input through the second upper capacitor C2A, through the second lower capacitor C2B to the output.

In addition, within the first peak state DP1, the second current path 102 may exhibit a further sub-path from ground, through the second lower capacitor C2B, through the second upper capacitor C2A, through the first lower capacitor C1B to the output. In a similar manner, within the second peak state DP2, the second current path 102 may exhibit a further sub-path from ground, through the first lower capacitor C1B, through the first upper capacitor C1A, through the second lower capacitor C2B to the output. By doing this, the efficiency and/or the reliability of the power converter 100 may be further increased.

The control unit 120 may be configured to determine a target conversion ratio between the input voltage VIN and the output voltage VOUT. Different states D1, D2, DV1, DV2, DP1, DP2 of the power converter 100 may be selected for the operation cycle in dependence of the target conversion ratio. As a result of this, the power converter 100 may be operated in a wide range of conversion ratios.

The control unit 120 may be configured to control the set of power switches S1-S15 such that the first upper capacitor C1A and the second upper capacitor C1B are bypassed during a complete operation cycle (notably during a sequence of complete operation cycles). Alternatively, or in addition, the control unit 120 may be configured to provide an operation mode of the power converter 100 within which the first upper capacitor C1A and the second upper capacitor C1B are bypassed, and/or within which power conversion is performed without involving the first upper capacitor C1A and the second upper capacitor C1B.

By providing an operation mode which bypasses the first and second upper capacitors C1A, C1B, relatively high conversion ratios CR>0.5 may be provided, thereby further increasing the operating range of the power converter 100.

In particular, the control unit 120 may be configured to operate the power converter 100 in a high conversion ratio operation mode (for CR>0.5). In the high conversion ratio operation mode, an operation cycle may comprise a first modified main state $D1_H$, a second modified main state $D2_H$ and a modified peak state $DP_H$.

Within the first modified main state $D1_H$, the power converter 100 may exhibit a first current path 101 from ground through the inductor L1, L2 to the output. Furthermore, within the first modified main state $D1_H$, the power converter 100 may exhibit a second current path 102 with a sub-path from the input through the second lower capacitor C2B to the output, and/or with a sub-path from the input through the first lower capacitor C1B to the output.

Within the second modified main state $D2_H$, the power converter 100 may exhibit a first current path 101 with a sub-path from ground through the first lower capacitor C1B, through the inductor L1, L2 to the output, and/or with a sub-path from ground through the second lower capacitor C2B, through the inductor L1, L2 to the output. Within the second modified main state $D2_H$, the power converter 100 may not exhibit any second current path 102 (which bypasses the inductor L1, L2).

Within the modified peak state $DP_H$, the power converter 100 may exhibit a first current path 101 from the input through the inductor L1, L2 to the output. Furthermore, within the modified peak state $DP_H$, the power converter 100 may exhibit a second current path 102 with a sub-path from the input through the second lower capacitor C2B to the output, and/or a sub-path from the input through the first lower capacitor C1B to the output.

The control unit 120 may be configured to operate the power converter 100 in a transition mode between a first operation mode which involves the first upper capacitor C1A and the second upper capacitor C1B and a second operation mode (notably the high conversion ratio operation mode) which does not involve the first upper capacitor C1A and the second upper capacitor C1B. The transition mode may be configured to discharge the first upper capacitor C1A and the second upper capacitor C1B such that a voltage across the respective upper capacitor C1A, C1B is substantially 0V. Alternatively, or in addition, the transition mode may be configured to modify a voltage across the first lower capacitor C1B and the second lower capacitor C2B from VIN−2*VOUT to VIN−VOUT. By providing a transition mode, the quality of voltage regulation of the power converter 100 may be increased.

The control unit 120 may be configured to operate the power converter 100 selectively in a step-up operation mode with the output voltage VOUT being greater than the input voltage VIN and in a step-down operation mode with the output voltage VOUT being smaller than the input voltage VIN. This may be achieved by exchanging the input and the output of the power converter 100. Possible states of an operation cycle for the step-up operation mode are described in the context of FIGS. 6A to 6F.

The control unit 120 may be configured to control the set of power switches S1-S15 such that during an alternative operation cycle, the power converter 100 is operated in a first alternative main state $D1_{H2}$ and in a second alternative main state $D2_{H2}$ in a mutually exclusive manner. The alternative operation cycle may be used to provide a conversion ratio CR=0.5 with increased efficiency.

Within the first alterative main state $D1_{H2}$, the power converter 100 may exhibit a first current path 101 from ground through the second lower capacitor C2B, through the second upper capacitor C2A, through the inductor L1, L2 to the output. Furthermore, within the first alterative main state $D1_{H2}$, the power converter 100 may exhibit a second current path 102 from the input through the first upper capacitor C1A, through the first lower capacitor C1B to the output.

Within the second alterative main state $D2_{H2}$, the power converter 100 may exhibit a first current path 101 from ground through the first lower capacitor C1B, through the first upper capacitor C1A, through the inductor L1, L2 to the output. Furthermore, within the second alterative main state $D2_{H2}$, the power converter 100 may exhibit a second current path 102 from the input through the second upper capacitor C2A, through the second lower capacitor C2B to the output.

The control unit 120 may be configured to control the set of power switches S1-S15 such that during the alternative operation cycle the power converter 100 is operated in a first alternative valley state $DV1_{H2}$ and in a second alternative valley state $DV2_{H2}$, which in particular lie, individually, in between the first alternative main state $D1_{H2}$ and the second alternative main state $D2_{H2}$ and/or in between the second alternative main state $D2_{H2}$ and the first alternative main state $D1_{H2}$. An example operation cycle may comprise the following sequence of states: $D1_{H2}$, $DV1_{H2}$, $D2_{H2}$, $DV2_{H2}$ (e.g., for CR≤0.5).

Within the first alternative valley state $DV1_{H2}$, the power converter 100 may exhibit a first current path 101 from ground through the inductor L1, L2 to the output. Furthermore, within the first alternative valley state $DV1_{H2}$, the power converter 100 may exhibit a second current path 102 from the input through the first upper capacitor C1A, through the first lower capacitor C1B to the output.

Within the second alternative valley state $DV2_{H2}$, the power converter 100 may exhibit a first current path 101 from ground through the inductor L1, L2 to the output. Furthermore, within the second alternative valley state $DV2_{H2}$, the power converter 100 may exhibit a second current path 102 from the input through the second upper capacitor C2A, through the second lower capacitor C2B to the output.

The control unit 120 may be configured to control the set of power switches S1-S15 such that during the alternative operation cycle the power converter 100 is operated in a first alternative peak state $DP1_{H2}$ and in a second alternative peak state $DP2_{H2}$, which in particular lie, individually, in between the first alternative main state $D1_{H2}$ and the second alternative main state $D2_{H2}$ and/or in between the second alternative main state $D2_{H2}$ and the first alternative main state $D1_{H2}$. An example operation cycle may comprise the following sequence of states: $D1_{H2}$, $DP1_{H2}$, $D2_{H2}$, $DP2_{H2}$ (e.g., for CR≥0.5).

Within the first alternative peak state $DP1_{H2}$, the power converter 100 may exhibit a first current path 101 from the input, through the inductor L1, L2 to the output. Furthermore, within the first alternative peak state $DP1_{H2}$, the power converter 100 may exhibit a second current path 102 from the input through the first upper capacitor C1A, through the first lower capacitor C1B to the output.

Within the second alternative peak state $DP2_{H2}$, the power converter 100 may exhibit a first current path 101 from the input, through the inductor L1, L2 to the output. Furthermore, within the second alternative peak state $DP2_{H2}$, the power converter 100 may exhibit a second current path 102 from the input through the second upper capacitor C2A, through the second lower capacitor C2B to the output.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter configured to convert electrical power at an input voltage at an input of the power converter to electrical power at an output voltage at an output of the power converter; wherein the power converter comprises,
   a first upper capacitor and a first lower capacitor, which are coupled with one another via a first mid node;
   a second upper capacitor and a second lower capacitor, which are coupled with one another via a second mid node;
   an inductor;
   a set of power switches; and
   a control unit configured to control the set of power switches such that during an operation cycle the power converter is operated in a first main state and in a second main state in a mutually exclusive manner;
   wherein within the first main state, the power converter exhibits
      a first current path from ground through the first lower capacitor, through the inductor to the output; and
      a second current path with
         1) A sub-path from the input, through the second upper capacitor, through the second lower capacitor to the output, and
         2) a sub-path from ground through the first lower capacitor, through the first upper capacitor, through the second lower capacitor to the output; and
   wherein within the second main state, the power converter exhibits
      a first current path from ground, through the second lower capacitor, through the inductor to the output; and
      a second current path with
         1) A sub-path from the input, through the first upper capacitor, through the first lower capacitor to the output, and
         2) A sub-path from ground, through the second lower capacitor, through the second upper capacitor, through the first lower capacitor to the output.

2. The power converter of claim 1, wherein
   the control unit is configured to control the set of power switches during a sequence of subsequent operation cycles; and each operation cycle comprises a first main state and a second main state.

3. The power converter of claim 1, wherein the control unit is configured to control the set of power switches such that
the first main state and the second main state are repeated in an alternating manner; and/or
a duty cycle and/or duration of the first main state is equal to a duty cycle and/or duration of the second main state.

4. The power converter of claim 1, wherein
the control unit is configured to control the set of power switches such that during an operation cycle the power converter is operated in a first valley state and in a second valley state, which in particular lie, individually, in between the first main state and the second main state and/or in between the second main state and the first main state;
within the first valley state, the power converter exhibits
a first current path from ground through the inductor to the output; and
a second current path from the input through the first upper capacitor, through the first lower capacitor to the output; and
within the second valley state, the power converter exhibits
a first current path from ground through the inductor to the output; and
a second current path from the input through the second upper capacitor, through the second lower capacitor to the output.

5. The power converter of claim 1, wherein
the control unit is configured to control the set of power switches such that during an operation cycle the power converter is operated in a first peak state and in a second peak state, which in particular lie, individually, in between the first main state and the second main state and/or in between the second main state and the first main state;
within the first peak state, the power converter exhibits
a first current path from the input, through the first upper capacitor, through the inductor to the output; and
a second current path from the input through the first upper capacitor, through the first lower capacitor to the output; and
within the second peak state, the power converter exhibits
a first current path from the input, through the second upper capacitor, through the inductor to the output; and
a second current path from the input through the second upper capacitor, through the second lower capacitor to the output.

6. The power converter of claim 5, wherein
within the first peak state, the second current path exhibits a further sub-path from ground, through the second lower capacitor, through the second upper capacitor, through the first lower capacitor to the output; and
within the second peak state, the second current path exhibits a further sub-path from ground, through the first lower capacitor, through the first upper capacitor, through the second lower capacitor to the output.

7. The power converter of claim 1, wherein the control unit is configured to
determine a target conversion ratio between the input voltage and the output voltage; and
select different states for the operation cycle of the power converter in dependence of the target conversion ratio.

8. The power converter of claim 7, wherein the control unit is configured to
use a state sequence comprising the first main state, followed by a first valley state, followed by the second main state and followed by a second valley state as an operation cycle, if the target conversion ratio lies between 0 and 0.33; and/or
use a state sequence comprising the first main state, followed by a first peak state, followed by the second main state and followed by a second peak state as an operation cycle, if the target conversion ratio lies between 0.33 and 0.5.

9. The power converter of claim 1, wherein the set of power switches comprises
a first power switch with an input node coupled to the input of the power converter and an output node coupled to an input node of the first upper capacitor and to an input node of a tenth power switch;
a second power switch with an input node coupled to the first mid node and an output node coupled to an input node of the inductor;
a third power switch with an input node coupled to an output node of the first lower capacitor and with an output node coupled to the output of the power converter;
a fourth power switch with an input node coupled to the output node of the first lower capacitor and with an output node coupled to ground;
a fifth power switch with an input node coupled to the input of the power converter and an output node coupled to an input node of the second upper capacitor and to an input node of an eleventh power switch;
a sixth power switch with an input node coupled to the second mid node and an output node coupled to the input node of the inductor;
a seventh power switch with an input node coupled to an output node of the second lower capacitor and with an output node coupled to the output of the power converter;
an eighth power switch with an input node coupled to the output node of the second lower capacitor and with an output node coupled to ground;
a nineth power switch with an input node coupled to the input node of the inductor and with an output node coupled to ground;
the tenth power switch with an output node coupled to the second mid node; and
the eleventh power switch with an output node coupled to the first mid node.

10. The power converter of claim 9, wherein
an output node of the first upper capacitor is coupled to an input node of the first lower capacitor at the first mid node;
an output node of the second upper capacitor is coupled to an input node of the second lower capacitor at the second mid node; and
an output node of the inductor is coupled to the output of the power converter.

11. The power converter of claim 9, wherein the set of power switches comprises
a twelfth switch in an anti-serial arrangement with the eleventh switch, which are located between the input node of the second upper capacitor and the first mid node;
a thirteenth switch in an anti-serial arrangement with the tenth switch, which are located between the input node of the first upper capacitor and the second mid node;

a fourteenth switch with an input node coupled to the input node of the first upper capacitor and an output node coupled to the input node of the inductor; and a fifteenth switch with an input node coupled to the input node of the second upper capacitor and an output node coupled to the input node of the inductor.

12. The power converter of claim 1, wherein the control unit is configured to control the set of power switches
such that the first upper capacitor and the second upper capacitor are bypassed during a complete operation cycle; and/or
to provide an operation mode of the power converter within which the first upper capacitor and the second upper capacitor are bypassed, and/or within which power conversion is performed without involving the first upper capacitor and the second upper capacitor.

13. The power converter of claim 1, wherein
the control unit is configured to operate the power converter in a high conversion ratio operation mode;
in the high conversion ratio operation mode, an operation cycle comprises a first modified main state, a second modified main state and a modified peak state;
within the first modified main state, the power converter exhibits
a first current path from ground through the inductor to the output; and
a second current path with
1) A sub-path from the input through the second lower capacitor to the output; and
2) a sub-path from the input through the first lower capacitor to the output;
within the second modified main state, the power converter exhibits
a first current path with
1) A sub-path from ground through the first lower capacitor, through the inductor to the output; and
2) a sub-path from ground through the second lower capacitor, through the inductor to the output;
within the modified peak state, the power converter exhibits
a first current path from the input through the inductor to the output; and
a second current path with
1) A sub-path from the input through the second lower capacitor to the output; and
2) A sub-path from the input through the first lower capacitor to the output.

14. The power converter of claim 1, wherein
the control unit is configured to operate the power converter in a transition mode between a first operation mode which involves the first upper capacitor and the second upper capacitor and a second operation mode which does not involve the first upper capacitor and the second upper capacitor;
the transition mode is configured to discharge the first upper capacitor and the second upper capacitor such that a voltage across the respective upper capacitor is substantially 0V; and
the transition mode is configured to modify a voltage across the first lower capacitor and the second lower capacitor from VIN−2*VOUT to VIN−VOUT.

15. The power converter of claim 1, wherein the control unit is configured to operate the power converter selectively in a step-up operation mode with the output voltage being greater than the input voltage and in a step-down operation mode with the output voltage being smaller than the input voltage.

16. The power converter of claim 1, wherein
the control unit is configured to control the set of power switches such that during an additional operation cycle the power converter is operated in a first additional main state and in a second additional main state in a mutually exclusive manner;
within the first additional main state, the power converter exhibits
a first current path from ground through the second lower capacitor, through the second upper capacitor, through the inductor to the output; and
a second current path from the input through the first upper capacitor, through the first lower capacitor to the output;
within the second additional main state, the power converter exhibits
a first current path from ground through the first lower capacitor, through the first upper capacitor, through the inductor to the output; and
a second current path from the input through the second upper capacitor, through the second lower capacitor to the output.

17. The power converter of claim 16, wherein
the control unit is configured to control the set of power switches such that during the additional operation cycle the power converter is operated in a first additional valley state and in a second additional valley state, which in particular lie, individually, in between the first additional main state and the second additional main state and/or in between the second additional main state and the first additional main state;
within the first additional valley state, the power converter exhibits
a first current path from ground through the inductor to the output; and
a second current path from the input through the first upper capacitor, through the first lower capacitor to the output; and
within the second additional valley state, the power converter exhibits
a first current path from ground through the inductor to the output; and
a second current path from the input through the second upper capacitor, through the second lower capacitor to the output.

18. The power converter of claim 16, wherein
the control unit is configured to control the set of power switches such that during the additional operation cycle the power converter is operated in a first additional peak state and in a second additional peak state, which in particular lie, individually, in between the first additional main state and the second additional main state and/or in between the second additional main state and the first additional main state;
within the first additional peak state, the power converter exhibits
a first current path from the input, through the inductor to the output; and
a second current path from the input through the first upper capacitor, through the first lower capacitor to the output; and
within the second additional peak state, the power converter exhibits
a first current path from the input, through the inductor to the output; and a second current path from the input through the second upper capacitor, through the second lower capacitor to the output.

19. A method for operating a power converter which is configured to convert electrical power at an input voltage at an input of the power converter to electrical power at an output voltage at an output of the power converter; wherein the power converter comprises, a first upper capacitor and a first lower capacitor, which are coupled with one another via a first mid node;

a second upper capacitor and a second lower capacitor, which are coupled with one another via a second mid node;

an inductor; and a set of power switches; and wherein the method comprises controlling the set of power switches such that during an operation cycle the power converter is operated in a first main state and in a second main state in a mutually exclusive manner;

wherein within the first main state, the power converter exhibits a first current path from ground through the first lower capacitor, through the inductor to the output; and a second current path with
1) A sub-path from the input, through the second upper capacitor, through the second lower capacitor to the output, and
2) a sub-path from ground through the first lower capacitor, through the first upper capacitor, through the second lower capacitor to the output; and wherein within the second main state, the power converter exhibits a first current path from ground, through the second lower capacitor, through the inductor to the output; and a second current path with
1) A sub-path from the input, through the first upper capacitor, through the first lower capacitor to the output, and
2) a sub-path from ground, through the second lower capacitor, through the second upper capacitor, through the first lower capacitor to the output.

* * * * *